United States Patent
Raether et al.

(10) Patent No.: US 10,137,396 B2
(45) Date of Patent: *Nov. 27, 2018

(54) FILTER ELEMENT, DUST COLLECTOR, AND METHODS

(71) Applicant: Donaldson Company, Inc., Minneapolis, MN (US)

(72) Inventors: Thomas D. Raether, St. Louis Park, MN (US); Brian Zauner, Lakeville, MN (US); Jim C. Rothman, Aurora, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/820,626

(22) Filed: Nov. 22, 2017

(65) Prior Publication Data

US 2018/0093213 A1   Apr. 5, 2018

Related U.S. Application Data

(63) Continuation of application No. 15/069,213, filed on Mar. 14, 2016, now Pat. No. 9,827,526, which is a
(Continued)

(51) Int. Cl.
*B01D 46/00*     (2006.01)
*B01D 46/10*     (2006.01)
*B01D 46/52*     (2006.01)

(52) U.S. Cl.
CPC ......... *B01D 46/008* (2013.01); *B01D 46/002* (2013.01); *B01D 46/0005* (2013.01);
(Continued)

(58) Field of Classification Search
CPC .. B01D 46/00; B01D 46/0005; B01D 46/002; B01D 46/0068; B01D 46/008;
(Continued)

(56) References Cited

U.S. PATENT DOCUMENTS 4,138,234 A   2/1979   Kubesa
4,218,227 A   8/1980   Frey
(Continued)

FOREIGN PATENT DOCUMENTS

DE      25 12 724 A1    12/1976
DE      39 05 113 A1     8/1990
WO  WO 2006/014941 A2   2/2006

*Primary Examiner* — T. Bennett McKenzie
(74) *Attorney, Agent, or Firm* — Merchant & Gould P.C.

(57) ABSTRACT

A filter element includes a media pack and a gasket member. The gasket member includes first and second gasket regions separated by a channel. The elements are usable in a dust collector having a dirty air inlet, a clean air outlet, and a tubesheet dividing between an unfiltered and a clean air volume. An element is removably mounted and sealed within the tube sheet. At least one projection angled relative to a plane of the tube sheet extends into the channel of the gasket member. A method of servicing a dust collector includes removing a first filter element from the tube sheet in the housing, and then sealing a second filter element against the tube sheet by orienting at least one projection extending from a plane of the tube sheet into a channel defined by a gasket member secured to the second filter element. An axial force is exerted to form a seal between the gasket member and the tube sheet.

21 Claims, 37 Drawing Sheets

Related U.S. Application Data continuation of application No. 12/936,079, filed as application No. PCT/US2009/039531 on Mar. 4, 2009, now Pat. No. 9,283,503.

(60) Provisional application No. 61/123,079, filed on Apr. 4, 2008, provisional application No. 61/079,959, filed on Jul. 11, 2008, provisional application No. 61/142,708, filed on Jan. 6, 2009.

(52) U.S. Cl.
CPC ......... *B01D 46/0068* (2013.01); *B01D 46/10* (2013.01); *B01D 46/525* (2013.01); *B01D 2271/027* (2013.01); *B01D 2275/10* (2013.01); *B01D 2275/201* (2013.01); *B01D 2275/206* (2013.01); *B01D 2275/208* (2013.01); *Y10T 29/4973* (2015.01)

(58) Field of Classification Search
CPC ...... B01D 46/10; B01D 46/42; B01D 46/525; B01D 46/52; B01D 2271/027; B01D 2275/10; B01D 2275/201; B01D 2275/206; B01D 2275/208; B01D 2201/304; Y10T 29/4973; B23P 6/00
USPC ................. 55/302–303, 344, 357, 482–520; 29/402.08; 95/280
See application file for complete search history.

(56) References Cited

U.S. PATENT DOCUMENTS

| | | | |
|---|---|---|---|
| 4,272,262 A * | 6/1981 | Britt | B01D 46/0068 55/302 |
| 4,395,269 A | 7/1983 | Schuler | |
| 4,648,889 A | 3/1987 | Jensen | |
| 5,458,774 A | 10/1995 | Mannapperuma | |
| 5,820,646 A | 10/1998 | Gillingham et al. | |
| 5,931,988 A * | 8/1999 | LeBlanc | B01D 46/001 55/341.1 |
| 5,980,598 A | 11/1999 | Horvat | |
| 6,090,173 A | 7/2000 | Johnson et al. | |
| 6,293,984 B1 | 9/2001 | Oda et al. | |
| 6,322,618 B1 | 11/2001 | Simms et al. | |
| 6,350,291 B1 | 2/2002 | Gieseke et al. | |
| 8,545,585 B2 | 10/2013 | Raether | |
| 2003/0121845 A1 | 7/2003 | Wagner et al. | |
| 2004/0194441 A1 | 10/2004 | Kirsch | |
| 2004/0237483 A1 | 12/2004 | Clements | |
| 2004/0255783 A1 | 12/2004 | Graham et al. | |
| 2005/0057002 A1 | 3/2005 | Chikura et al. | |
| 2006/0112667 A1 | 6/2006 | Sporre et al. | |
| 2006/0163150 A1 | 7/2006 | Golden et al. | |
| 2006/0288674 A1 | 12/2006 | Amesoeder et al. | |
| 2007/0006560 A1 | 1/2007 | Ruhland et al. | |
| 2007/0261374 A1 | 11/2007 | Nelson et al. | |
| 2009/0107905 A1 | 4/2009 | Schmitt | |
| 2011/0041692 A1 | 2/2011 | Raether | |
| 2014/0047980 A1 | 2/2014 | Raether | |

\* cited by examiner

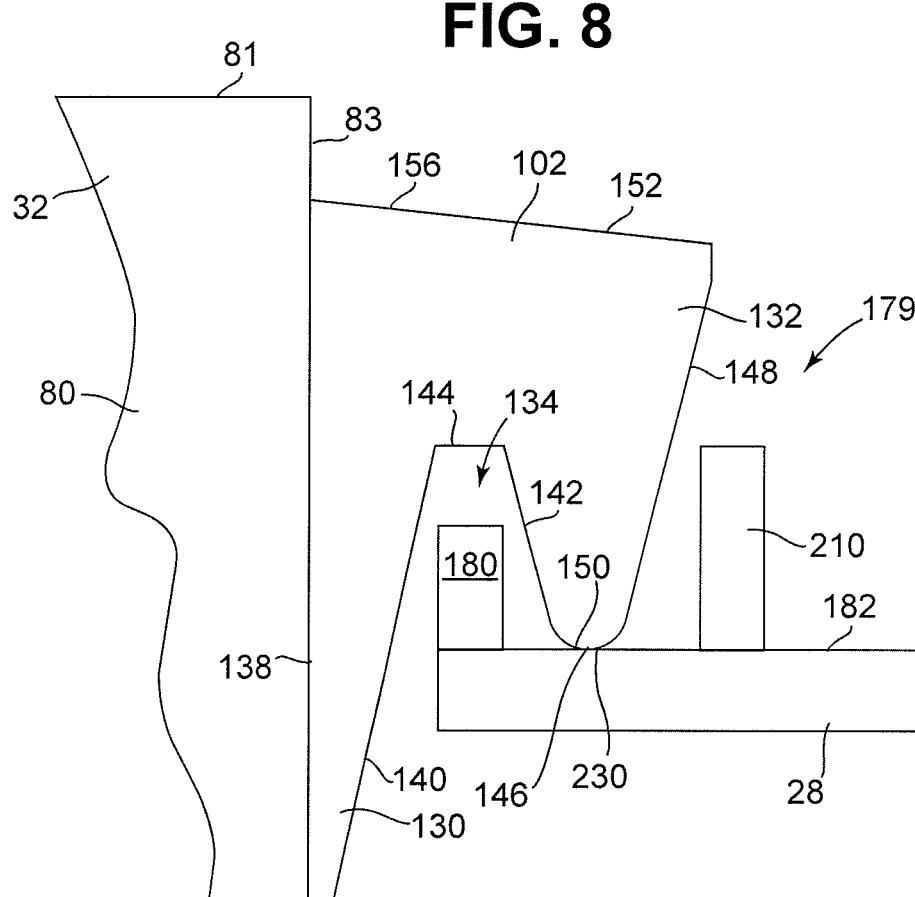
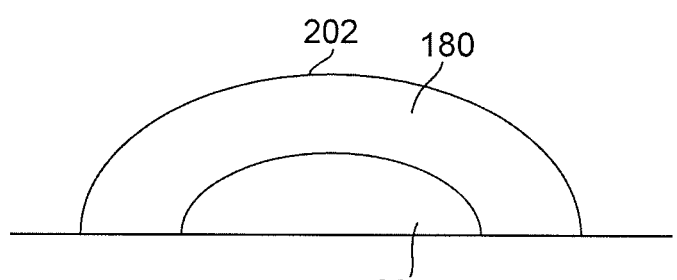

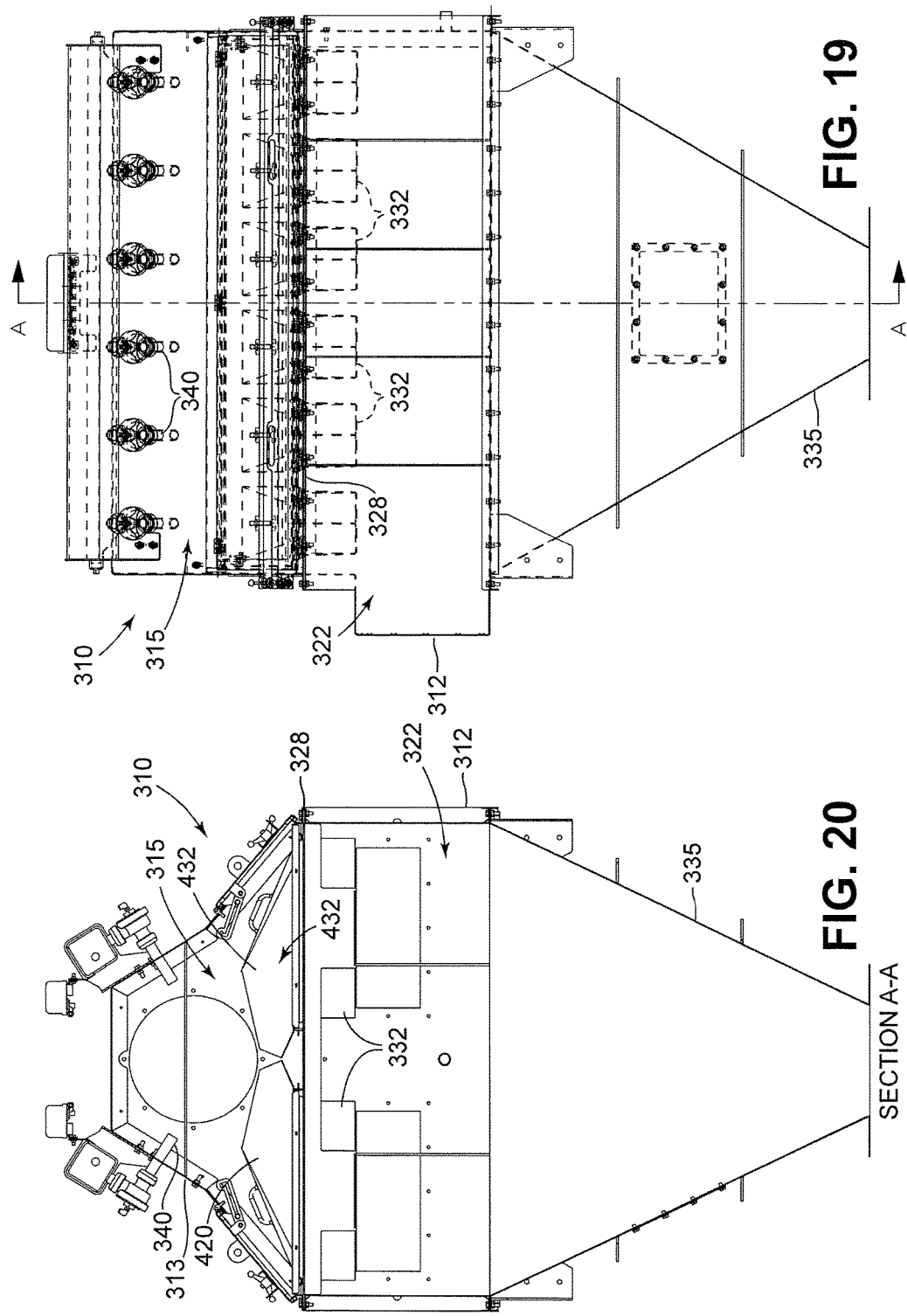

SECTION A-A

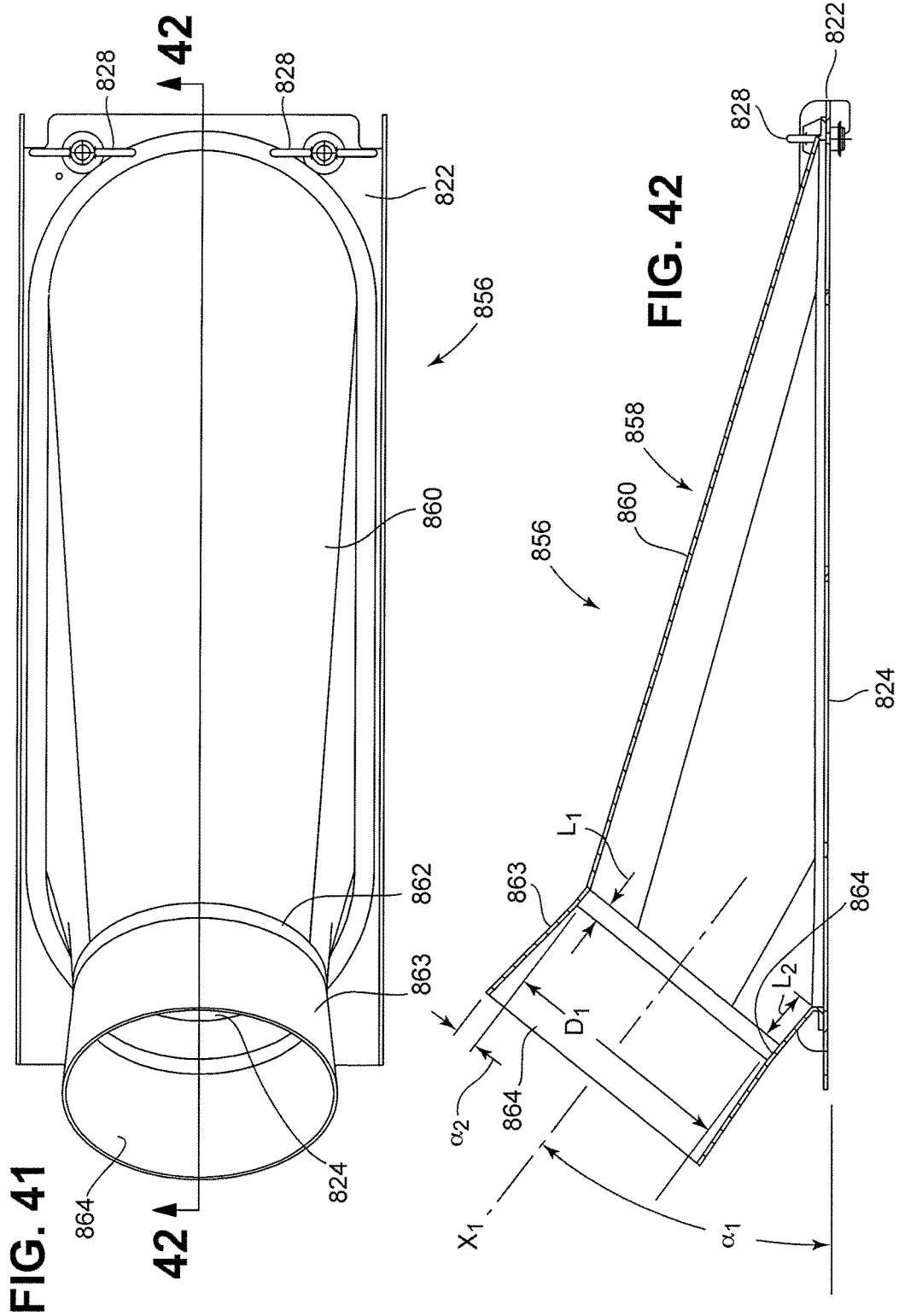

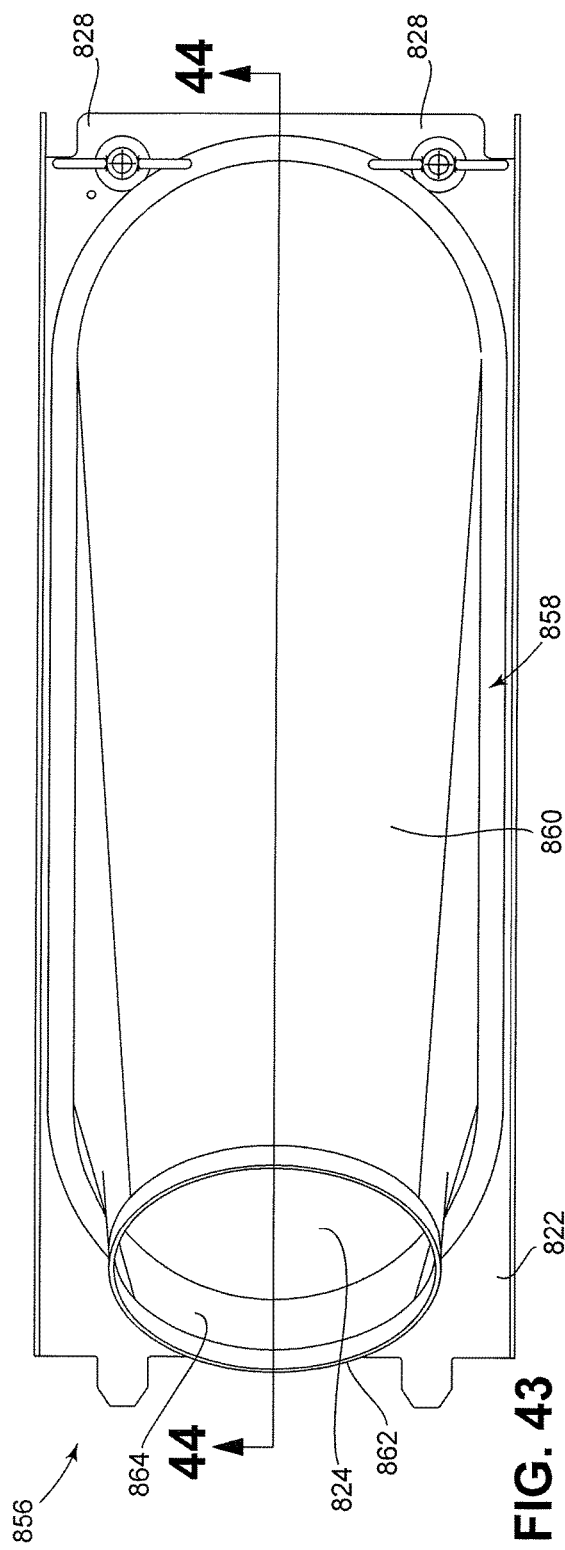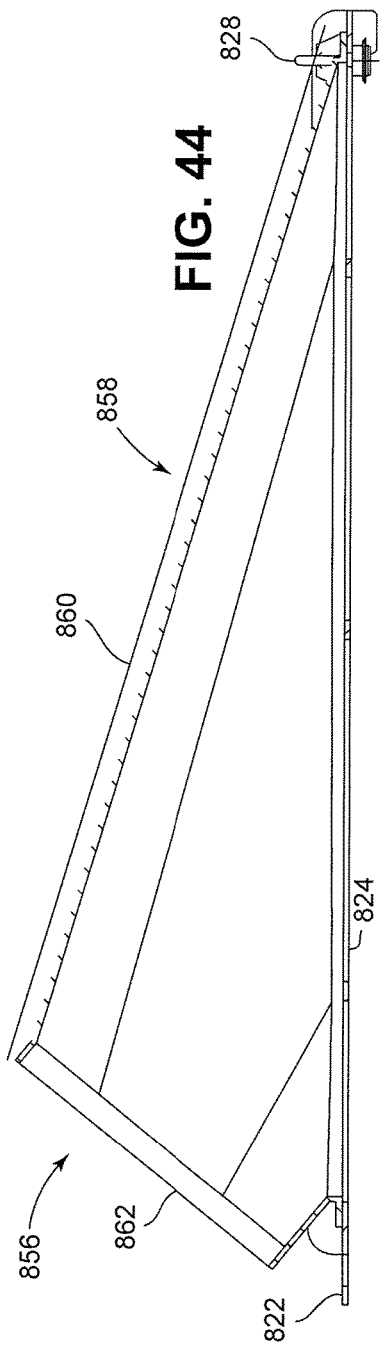

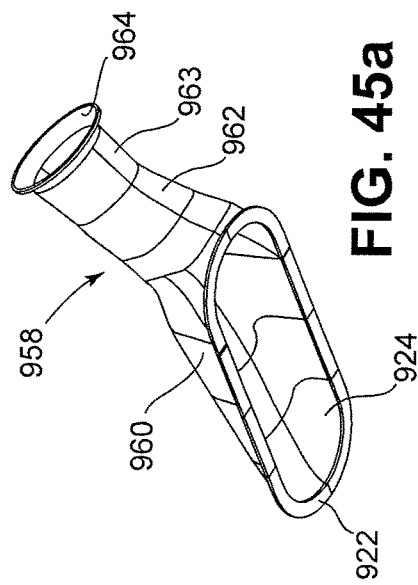
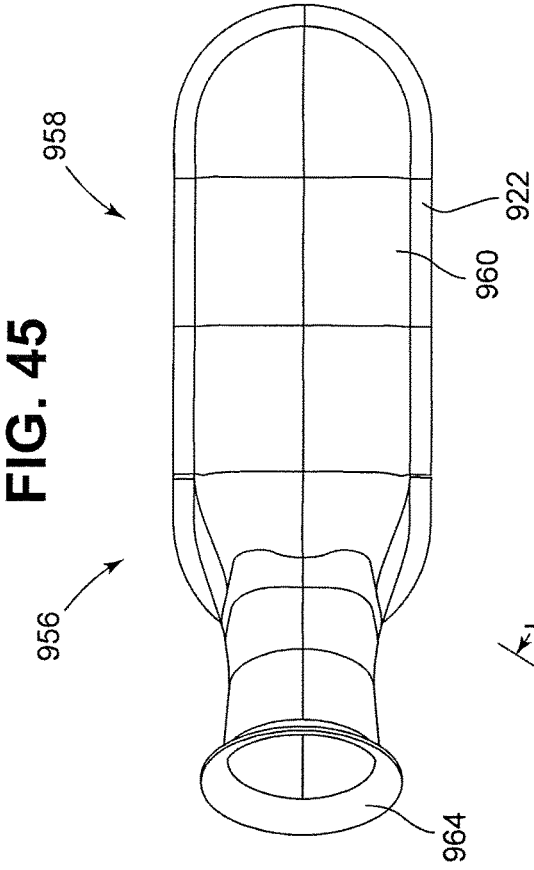
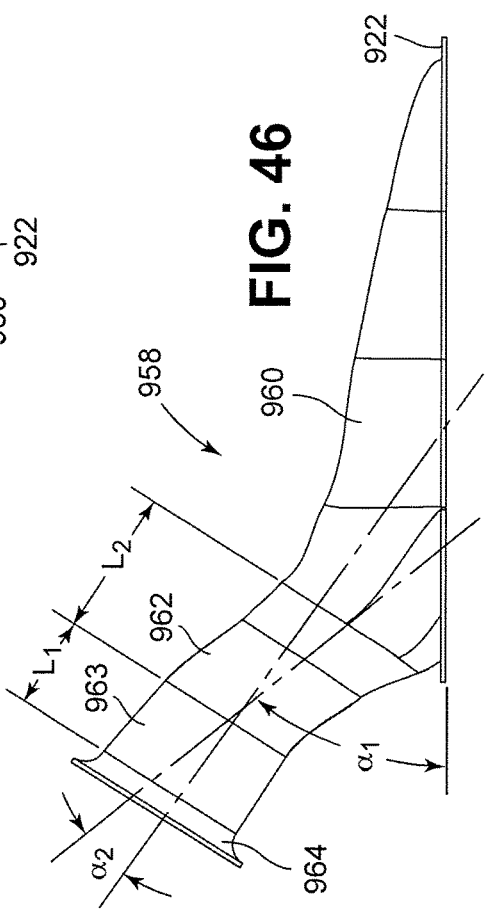
FIG. 45a
FIG. 45
FIG. 46

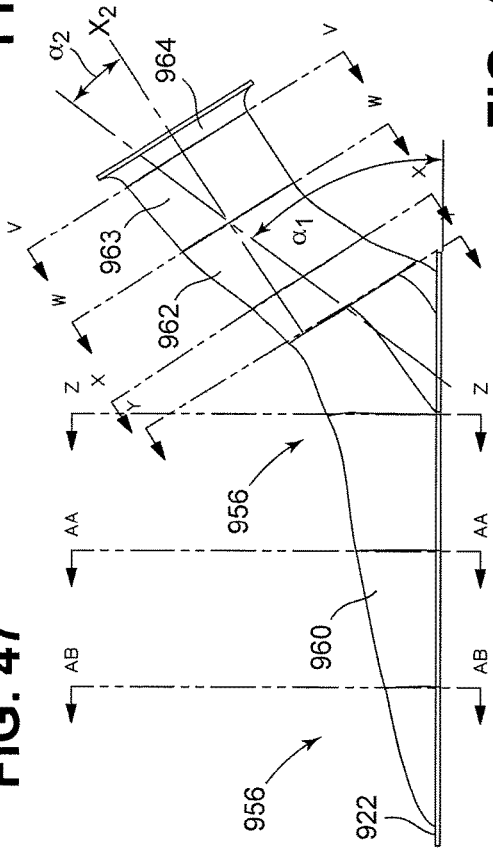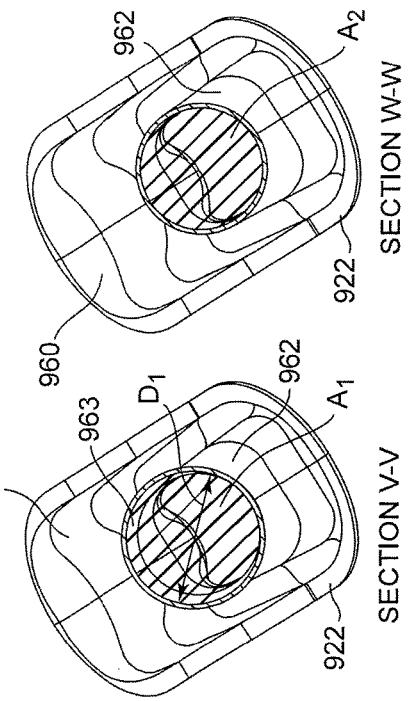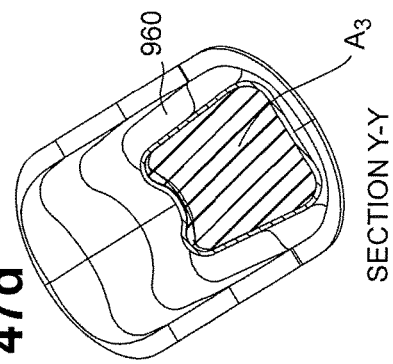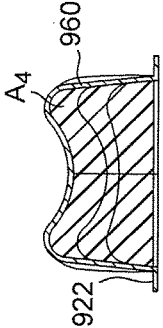

FILTER ELEMENT, DUST COLLECTOR, AND METHODS

This application is a Continuation of U.S. Ser. No. 15/069,213, filed Mar. 14, 2016, which is a continuation of U.S. Ser. No. 12/936,079, filed Mar. 29, 2011, which issued as U.S. Pat. No. 9,283,503 on Mar. 15, 2016, which is a US National Stage of PCT International Patent application No. PCT/US2009/039531 filed Apr. 3, 2009 in the name of Donaldson Company, Inc., a U.S. national corporation, applicant for the designation of all countries except the US, and Thomas D. Raether, Brian Zauner, and Jim C. Rothman, all citizens of the U.S., applicants for the designation of the US only, and claims priority to U.S. Provisional patent application Ser. Nos. 61/123,079, filed Apr. 4, 2008, 61/079,959, filed Jul. 11, 2008, and 61/142,708, filed Jan. 6, 2009 and which applications are incorporated herein by reference. To the extent appropriate, a claim of priority is made to each of the above disclosed applications.

TECHNICAL FIELD

This disclosure relates to filter elements, dust collectors, methods for pulse cleaning filter elements utilizing pressurized gas generators, methods of filtering, and methods of servicing. This disclosure also relates to apparatus including air cleaners, dust filters, and pulse cleaning technology.

BACKGROUND

Dust collectors include systems that take in unfiltered air, filter it, and exhaust clean air. Dust collectors are used in an variety of environments, including factories, for example. These systems often have one or more filter elements that are periodically changed out. These systems also sometimes use pressurized gas to direct a pulse of gas (air) from the downstream side of the filter element to the upstream side. This helps to remove some of the dust and debris collected on the upstream side of the filter element, which allows the filter element to be used longer before the restriction becomes so high that it needs to be changed. Examples of such air filters assemblies are disclosed in, for example, U.S. Pat. Nos. 6,090,173; 4,218,227; 4,395,269; 5,980,598; 6,322,618; DE 3905113; and Patent Publication U.S. 2006/0112667A1, each of these patent documents being incorporated by reference herein. Improvements in filter elements and dust collectors and methods are desirable.

SUMMARY

A filter element is provided, including a media pack and a gasket member. The gasket member includes first and second gasket regions separated by a channel.

One or more filter elements are usable in a dust collector. One example dust collector includes a collector housing having a dirty air inlet, a clean air outlet, and a tube sheet dividing the housing between an unfiltered air volume and a clean air volume. At least one filter element is removably mounted and sealed within the tube sheet. The at least one filter element includes a media pack having first and second opposite axial ends and a side extending between the first and second axial ends. A gasket member is adjacent to the side. The gasket member includes first and second gasket regions separated by a channel. The first gasket region is nearer the media pack than the second gasket region. The channel is an open volume between the first and second gasket regions. At least one projection angled relative to a plane of the tube sheet and extends into the channel of the gasket member. An air direction arrangement is constructed and arranged to draw air through the dirty air inlet, into the unfiltered air volume, through the filter element, into the clean air volume, and then out through the clean air outlet.

A method of servicing a dust collector includes removing a first filter element from the tube sheet in the housing, and then sealing a second filter element against the tube sheet by orienting at least one projection extending from a plane of the tube sheet into a channel defined by a gasket member secured to the second filter element. Next, an axial force is exerted against the gasket member to form a seal between the gasket member and the tube sheet.

BRIEF DESCRIPTION OF THE DRAWINGS

FIG. 8 is a drawing similar to FIGS. 6 and 7, but showing another embodiment of a tube sheet;

FIG. 9 is a side elevational view of a portion of the tube sheet of FIG. 8;

FIGS. 15-17 are schematic, top plan views of filter elements that can be utilized with the system, in accordance with principles of this disclosure;

FIG. 19 is a front elevational view of the dust collector of FIG. 18;

FIG. 20 is a cross-sectional view of the dust collector of FIGS. 18 and 19, the cross-section being taken along the line A-A of FIG. 19;

FIG. 41 is a schematic, top plan view of another embodiment of an accumulator.

FIG. 42 is a schematic, cross-sectional view of the accumulator of FIG. 41.

FIG. 43 is a schematic, top plan view of the accumulator of FIG. 41, but without a scoop section.

FIG. 44 is a schematic, cross-sectional view of the accumulator of FIG. 41, but without a scoop section.

FIG. 45 is a schematic, top plan view of another embodiment of an accumulator.

FIG. 45a is a bottom perspective view of the accumulator of FIG. 45.

FIG. 46 is a schematic, cross-sectional view of the accumulator of FIG. 45.

FIG. 47 is a schematic, cross-sectional view of the accumulator of FIG. 45 with the addition of lettered cross section identifiers.

FIG. 47a is a schematic, cross-sectional view of the accumulator of FIG. 45 corresponding to section V-V shown on FIG. 45.

FIG. 47b is a schematic, cross-sectional view of the accumulator of FIG. 45 corresponding to section W-W shown on FIG. 45.

FIG. 47c is a schematic, cross-sectional view of the accumulator of FIG. 45 corresponding to section X-X shown on FIG. 45.

FIG. 47d is a schematic, cross-sectional view of the accumulator of FIG. 45 corresponding to section Y-Y shown on FIG. 45.

FIG. 47e is a schematic, cross-sectional view of the accumulator of FIG. 45 corresponding to section Z-Z shown on FIG. 45.

FIG. 47f is a schematic, cross-sectional view of the accumulator of FIG. 45 corresponding to section AA-AA shown on FIG. 45.

FIG. 47g is a schematic, cross-sectional view of the accumulator of FIG. 45 corresponding to section AB-AB shown on FIG. 45.

DETAILED DESCRIPTION

A. Example System of FIGS. 1-3

Figure 1:
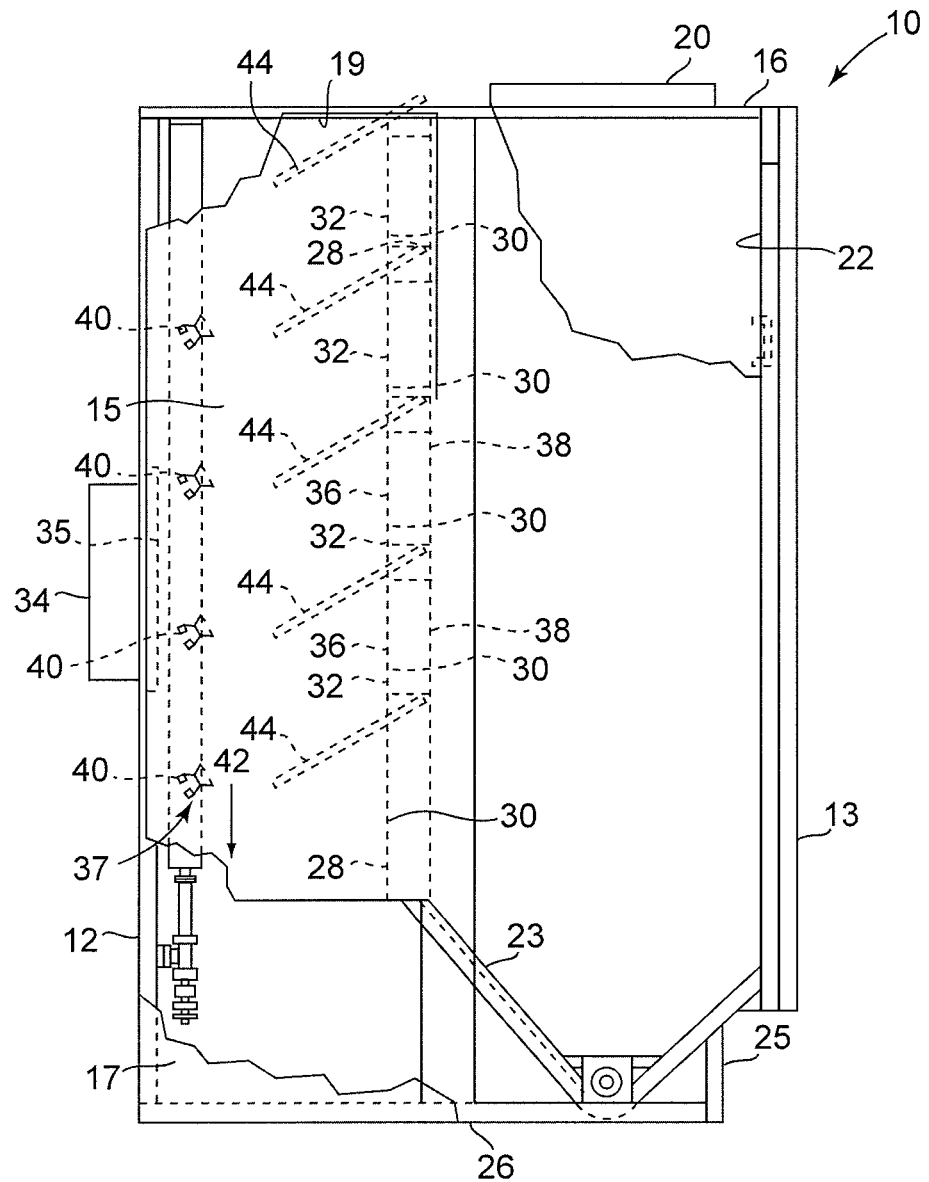
FIG. 1 is a side elevational view, partially broken away, of one embodiment of an air filter system utilizing principles of this disclosure.

A dust collector, or air cleaner system, is depicted generally at 10 in FIG. 1. The system depicted includes a housing 12 having a side wall panel 17 broken away to illustrate the arrangement of various portions of the assembly. An upper wall panel 16 has an inner wall surface 19. In this embodiment, a dirty air inlet 20 is positioned in the upper wall panel 16 so that the particulate-laden air or other fluid is introduced into an unfiltered (dirty) fluid volume or chamber 22. The unfiltered volume 22 is defined by an access door 13, the upper wall panel 16, opposing side wall panels 17, a tube sheet 28, and a bottom surface 23 partially defining a collection area or hopper 25. The bottom base panel or frame 26 is secured to the side wall panels 17 in a suitable manner.

As mentioned above, the tube sheet 28 is mounted in the interior of the housing 12. The tube sheet 28 includes a plurality of openings 30. Within each opening 30 is mounted an individual filter element, which in the illustrated embodiment, is a panel-style filter element 32. By the term "panel-style filter element" it is meant an element with filter media in which, in general, fluid to the filtered flows through the filter element in a straight-flow thorough manner. For example, a panel-style filter element can be pleated media, depth media, fluted media, Z-media, or mini V-packs.

By "Z-media", it is meant media having first and second opposite flow faces with a plurality of flutes, each of the flutes having an upstream portion adjacent to the first flow face and a downstream portion adjacent to second flow face, selected ones at the flutes being open at the upstream portion and closed at the downstream portion, while selected ones of the flutes are closed at the upstream portion and open at the downstream portion. The flutes open at the upstream end are "inlet flutes", while the flutes open at the downstream end are "outlet flutes." The flutes can be straight, tapered, or darted. Examples of filter elements with Z-media are found in, for example, U.S. Pat. No. 5,820,646; Patent Publication 2003/0121845; and U.S. Pat. No. 6,350,291, each of these patent documents being incorporated by reference herein. Depending on what type of panel-style filter element is selected, the dust collector housing 12 will have to be designed to accommodate the differences between the various types of panel-style media, including for example, differences in restriction, the volume of space occupied by the media, and how the media needs to be sealed. It should be understood that the Z-media includes a media pack having opposite inlet and outlet flow faces; the media pack comprising a plurality of flutes extending in a direction between the inlet flow face and the outlet flow face; the media pack being closed to air entering the inlet flow face and passing outwardly from the outlet flow face without filtering flow through media of the media pack.

The downstream sides of the filter elements are in communication with a filtered air volume 15. The filtered air is exhausted through a clean air outlet 34. An air direction arrangement 35, which can be, for example, a fan, blower, or bin-vent air direction arrangement 35 (shown schematically in hidden lines) operates to draw unfiltered air into the inlet 20 of the housing 12 and exhaust filtered air through the outlet 34. While it is shown schematically at 35 within the housing 12, it should be understood that the air direction arrangement 35 can be located outside of the housing and be connected through suitable duct work; or, in the case of a bin-vent, it is the construction of the housing so that as a commodity is loaded into its holder and as it fills up, the pressure builds up and then cause air to flow through the housing 12.

In operation, fluid, such as air, to be filtered flows into the system 10 through the inlet 20. From there, it flows through the filter elements 32. The filter elements 32 remove particulate material from the fluid. The filtered fluid then flows into the clean air volume or filtered air volume or flow chamber 15. From there, the clean air flows through an outlet 34.

Periodically, the filter elements 32 will be cleaned through a pulse jet system 37 by pulsing a fluid jet, such as a jet 39 (FIGS. 2-4) of pressurized gas (e.g. air), from a downstream side 36 of the filter element 32 to an upstream side 38 of the filter element 32. Specifically, jet 39 of pressurized gas will be directed through individual blow pipes 40, in preferred embodiments, a respective blow pipe 40 being oriented for each of the respective filter elements 32. This will direct the jet 39 through each filter element 32, from the downstream side 36 to the upstream side 38. This helps to knock debris and particulate from the upstream side 38 of the filter element 32, directing it off the filter element 32 and into a hopper.

Figure 2:
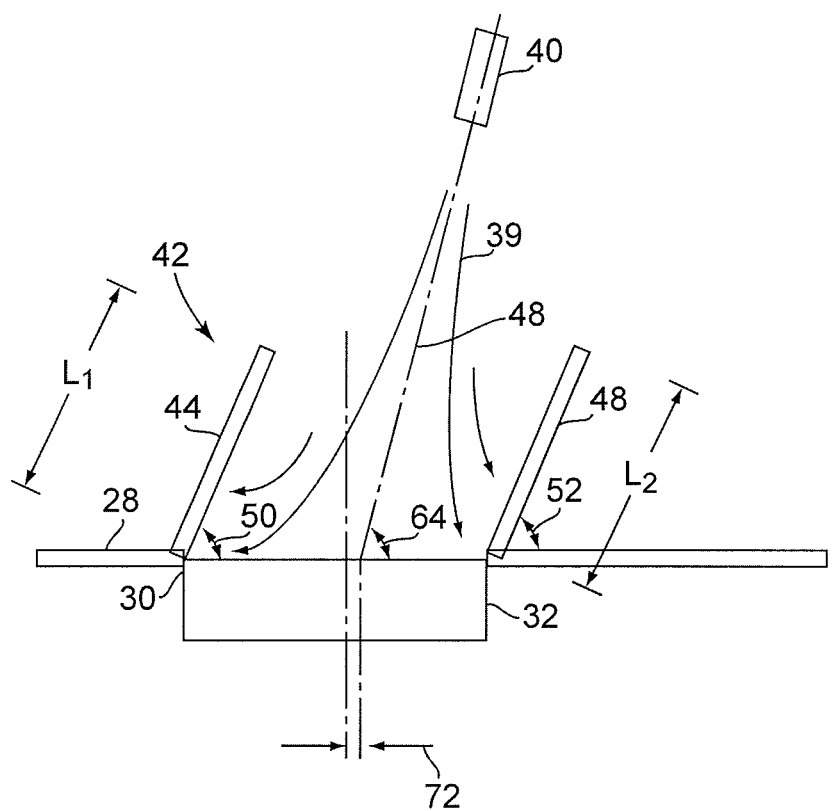
FIG. 2 is a schematic side elevational view illustrating principles of this disclosure.

A schematic illustration of the portion of the system 10 is illustrated in FIG. 2. In FIG. 2, the blow pipe 40 can be seen oriented with respect one the filter elements 32 in the opening 30 in the tube sheet 28. In FIG. 2, it can be seen how the blow pipe 40 is oriented relative to the filter element 32 in a plane 60 (FIG. 3) that contains the respective opening 30 in the tube sheet 28 for the respective filter element 32, such that a pulse that comes from the blow pipe 40 is at an angle that is not normal to a plane of the opening 30 and is not in line with a general direction of filtration flow thorough the filter element 32. By the term "not normal", it is meant non-orthogonal, such as at an acute or obtuse angle relative to the plane 60 that contains the opening 30 for the respective filter element 32. By "not in line with a general direction of filtration flow", it is meant, for a straight-through flow filter, the pulse flow is in a direction that is not parallel to the flow of direction through the filter element 32. By directing the fluid pulse at the filter element 32 at such an angle 64, the exhaust jet, which expands at a predictable angle, creates a diameter D2 (FIG. 3) larger in one direction that a diameter D1 that is typically used in the prior art.

While the illustrated embodiment shows only a single blowpipe 40 corresponding to a single filter element 32, it should be understood that in other implementations, there are more than one blowpipe 40 for each element 32.

In some embodiments, at least a portion of the pulse can be trapped by using an optional accumulator arrangement 42. The accumulator arrangement 42 captures the flow of the pulse from the blow pipe 40. In one embodiment of FIGS. 1 and 2, the accumulator arrangement 42 includes a least one plate, shown as first plate 44, oriented on the clean air side 15 of the tube sheet 28 and adjacent to the opening 30 of the tube sheet 28. Another embodiment of an accumulator arrangement is shown at reference numeral 232 in FIGS. 4 and 5, described below. Referring again to FIGS. 1 and 2, the first plate 44 may be any type of wall, sheet metal, panel, baffle, rigid plastic, or generally non-porous solid structure that is oriented to the adjacent respective opening in the tube sheet 28 for the respective filter element 32.

In embodiment of FIGS. 1 and 2, the accumulator arrangement includes a second plate 46 oriented at an opposite end of the opening 30 at the tube sheet 28 from the first plate 44. In the embodiment shown, the first and second plates 44, 46 are aligned with the general direction of the pulse, but the angle does not necessarily need to be the same as the angle of the pulse direction. FIG. 2 illustrates a center line of the direction of the pulse at 48. The first plate is mounted at a first angle 50 relative to the tube sheet 28. The first angle is within about 5° of center line 48 of a direction of the pulse. Similarly, the second plate 46 is mounted at a second angle 52 relative to the tube sheet 28. The second angle 52 is within about 5° of the center line 48 of a direction of the pulse. In some embodiments, the first angle 50 and the second angle 52 are equal. In other embodiments, the first angle 50, and second angle 52 are unequal. In some embodiments, the first angle 50 and the second angle 52 are within 30° of being parallel to each other. The angles 50, 52 of the plates 44, 46 are selected based upon the angle 53 of the pulse.

As illustrated in FIG. 2, the first plate 44 has length $L_1$, which is preferably no longer than three times the length of the respective opening 30 in the tube sheet 28. This is because primary flow pressure loss increases with increase in length. Preferably, the length $L_1$ has a length that is between 25-75% of a length of the respective opening 30 in the tube sheet 28. In preferred embodiments, the blowpipe 40 is spaced no more than 30-40 times of an inside diameter of the blowpipe from the tube sheet to eject the pulse.

In FIG. 2, reference numeral 72 shows the offset between the pulse center line 48 and a center of the filter element 32. This shows how the center line 48 of the pulse is not always in alignment with the center of the filter element 32.

In one embodiment, the plate that is closer to the respective blow pipe 40 (in the embodiment illustrated, the second plate 46) has a length that is shorter than the other plate (in this example, the first plate 44). In one embodiment, this shorter plate 46 has a length that is not less than 5% of a length of the respective opening 30 in the tube sheet 28. This arrangement is advantageous because of both material savings and pressure loss associated with pumping air flow.

Figure 3:
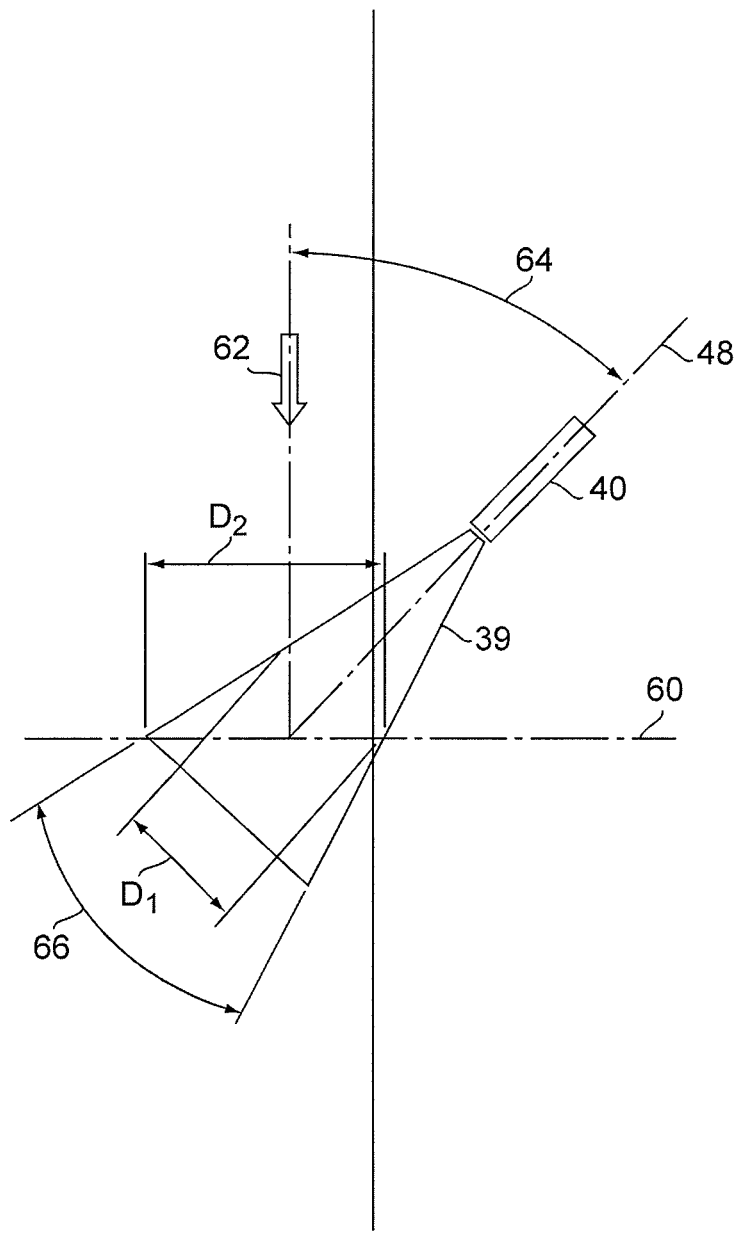
FIG. 3 is a schematic diagram illustrating principles of this disclosure.

Attention is directed to FIG. 3. In FIG. 3, the arrow 62 represents the prior art pulse direction. In the prior art, the standard pulse direction is directed perpendicular or normal to the plane 60 that contains the tube sheet 28. Angle 64 shows the angle that is offset to the vertical direction, or the direction from the standard, prior art direction shown by arrow 62. A typical pulse expansion is shown at angle 66, from the blow pipe 40. As explained above, the exhaust jet from the blow pipe 40 creates a diameter D2, covering a larger surface area in the opening 30 of tube sheet 28, versus diameter D1 that comes from the exhaust jet shown at arrow 62 in the prior art arrangement.

One useful arrangement has the following angles and dimensions: Angle 64 is 25°-35°, preferably 29°; angles 50 and 52 are equal and 18°-25°, preferably 22°-23°; first and second plates 44, 46 are parallel; offset 72 is about 1 inch;

length L1 is about 16-20 inches, preferably about 18.75 inches; and length L2 is about 6-10 inches, preferably about 8.0 inches.

B. Example System of FIG. 4

Figure 4:
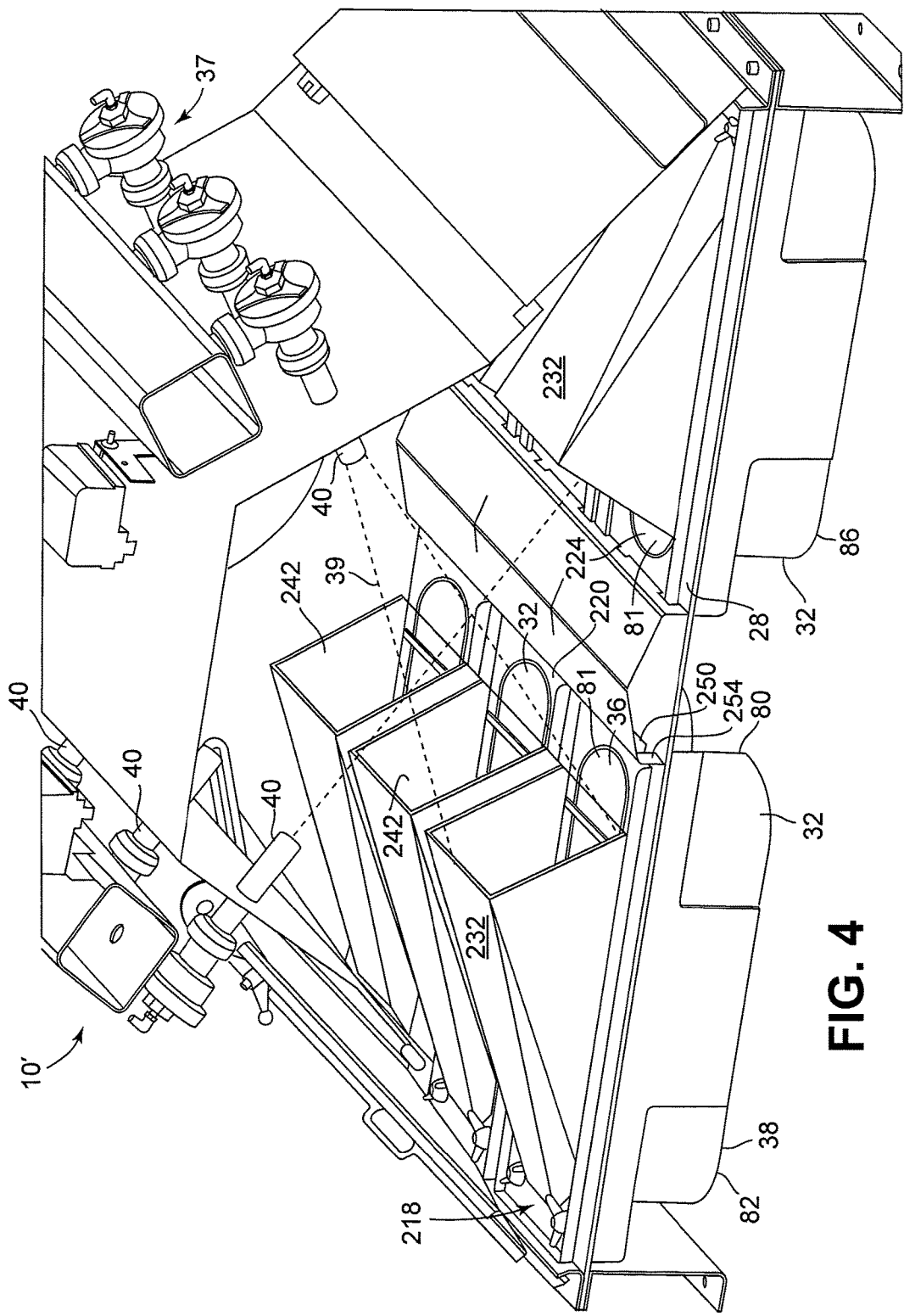
FIG. 4 is a schematic view of another embodiment of a dust collector system utilizing principles of this disclosure.

FIG. 4 depicts another embodiment of a dust collector 10'. In FIG. 4, useful embodiments for the filter element 32 are illustrated. Filter element 32 includes a media pack 80 of Z-media, the definition of Z-media as characterized above in Section A. The media pack 80 has first and second opposite axial ends, or flow faces 81, 82, and a side (or side wall) 83 extending between the first and second flow faces 81, 82. In implementation, the first flow face 81 also corresponds to the downstream flow face 36, while the second flow face 82 corresponds to the upstream flow face 38.

In the embodiment shown, the media pack 80 includes a non-cylindrical pack of media that is a coiled construction 86. In alternative embodiments, the media pack 80 can be a construction of stacked Z-media. The coiled construction 86 has an overall cross-sectional shape that can be oval (FIG. 17) or race track-shaped (FIG. 15). In FIG. 15, the filter element 32 is shown schematically in top plan, such that the downstream flow face 81 is visible. In FIG. 15, it can be seen that in this embodiment, the media pack 80 is race track-shaped in that it has a pair of straight parallel sides 88, 89 joined by rounded ends 90, 91. In other embodiments, the media pack 80 can be round (FIG. 16) or rectangular, or rectangular with rounded corners.

In FIGS. 15-17, only a portion of the flow face 81 of the media pack 80 is depicted schematically. It should be understood that the entire flow face 81 has filter media, but only the portion shown at reference numeral 80a is depicted in FIGS. 15-17.

C. Example Gasket Member of FIGS. 6-14

In reference now to FIGS. 6-14 and 27-28, the filter element 32 further includes a gasket member 102. The gasket member 102 is adjacent to the side 83 of the media pack 80. In preferred implementations, the gasket member 102 is secured to the side 83 and is molded directly to the side 83 of the media pack 80. In other embodiments, the gasket member 102 can be pre-made through, for example, an extrusion process and then attached to the side 83 of the media pack 80 by glue or an adhesive.

In the embodiment of FIGS. 6-8, 10-12 and 27-28, the gasket member 102 is identically structured, with the only difference between these various figures being the tube sheet 28, or other structure relating to the collector housing. These differences are further described below. Initially, the gasket member 102 depicted in FIGS. 6-8, 10-12 and 28-29 are now described.

In the embodiment shown, the gasket member 102 includes a first gasket region 130 and a second gasket region 132 separated by a channel 134. The first gasket region 130 is nearer the media pack 80 than the second gasket region 132. In the embodiment shown, the first gasket region 130 is secured directly against the media pack 80, while the second gasket region 132 is remote from and radially spaced from the media pack 80. Example uses for the gasket member 102 including the channel 134 are described below in Section E.

The first gasket region 130, in the embodiment shown, includes an attachment surface 138 secured to the side 83 of the media pack 80. In this particular embodiment, the first gasket region 130 has a first channel surface 140 angled from the attachment 138 in a direction toward the second gasket region 132.

In the embodiment shown, the second gasket region 132 includes a second channel surface 142 angled in a direction toward the first gasket region 130 and in a direction toward the first channel surface 140. Located in between the first channel surface 140 and the second channel surface 142 is a base 144. Of course, the first and second channel surfaces 140 and 142 can meet at an apex or point and not have base 144. This is merely one example embodiment.

In the embodiment shown, the first channel surface 140, the second channel surface 142, and the base 144 define the channel 134. The channel 134 is an open volume between the first and second gasket regions 130, 132.

In the embodiment shown, the channel 134 has a length 145 of at least 0.3 inch, for example, 0.4-0.6 inch. In the embodiment shown in FIG. 6, the length is measured from the end tip 146 of the second gasket region 132 to the base 144, when the gasket member 102 is in an uncompressed state. In the embodiment shown, the channel 134 has an average width of about 0.15 inch, as measured between the first and second gasket regions 130, 132. For example, at the base 144, the channel 134 has a width of about 0.04-0.08 inch, for example about 0.06 inch, while the width of the channel 134 at its widest area, between end tip 146 of the second gasket region 132 and a portion of the first gasket region 130 directly horizontal from tip 146, is at least 0.15 inch, for example about 0.2-0.4 inch, typically about 0.25 inch.

In the embodiment shown, the second gasket region 132 further includes an outer angled surface 148. The outer angled surface 148, in the embodiment shown, is slanted in a direction from the tip 146 away from the second channel surface 142. As can be seen, in this embodiment, the second channel surface 142 and the outer surface 148 meet at an apex 150, which is also the end tip 146. The outer angled surface 148 generally slants in a direction from the apex 150 to a first axial gasket region 152. The first axial gasket region 152 is adjacent to the first axial end 81 of the media pack 80. Opposite of the first axial gasket region 152 is a second axial gasket region 154. The second axial gasket region defines the channel 134.

In the embodiment shown, the first axial gasket region 152 is a straight surface 156. The straight surface 156 can be angled in a direction downwardly and away from the media pack 80.

Figure 13:
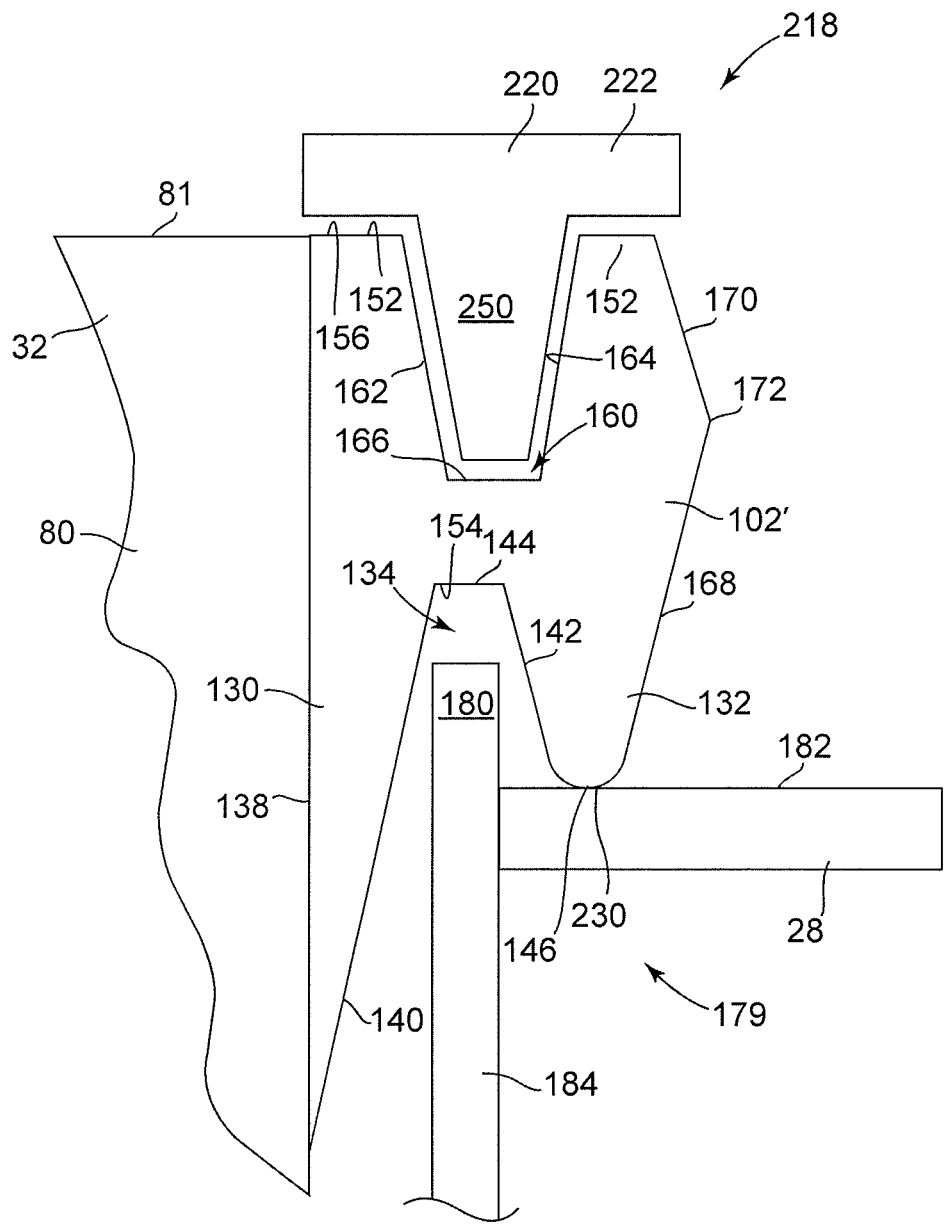
FIG. 13 is a view similar to FIGS. 6-8 and 10-12, but showing another embodiment of a gasket member, tube sheet, and clamp.

FIG. 13 illustrates an alternative embodiment of a gasket member 102'. The gasket member 102' has many of the same features as gasket member 102. For example, gasket member 102' includes first gasket region 130, second gasket region 132, and a channel 134 separating the first gasket region 130 and second gasket region 132. Other analogous features of gasket member 102 include attachment surface 138, first channel surface 140, second channel surface 142, base 144, tip 146, first axial gasket region 152, and second axial gasket region 154.

In the embodiment of FIG. 13, the first axial gasket region 152 defines a second channel 160. The second channel 160 has an open volume. The second channel 160 is defined by a first channel surface 162 that is part of the first gasket region 130 and slopes from the straight surface 156 downwardly and away from the first flow face 81 in a direction toward the second gasket region 132. The second channel 160 is also defined by a second surface 164. The second channel surface 164 and the first channel surface 162 are joined by an intervening base 166. The second channel surface 164 is angled upwardly and away from the base 166 and away from the first gasket region 130.

In the embodiment of FIG. 13, the second gasket region 132 further includes a first outer angled surface 168 extending from the end tip 146, and a second outer angled surface 170 extending from the first axial gasket region 152. It should be noted that in FIG. 13, the first axial gasket region 152 is separated into two portions by the second channel surface 164. The second outer angled surface 170 extends from the first axial gasket region 152 that is located on the second gasket region 132. The first outer angled surface 168 and the second outer angled surface 170 generally meet at an apex 172.

Figure 14:
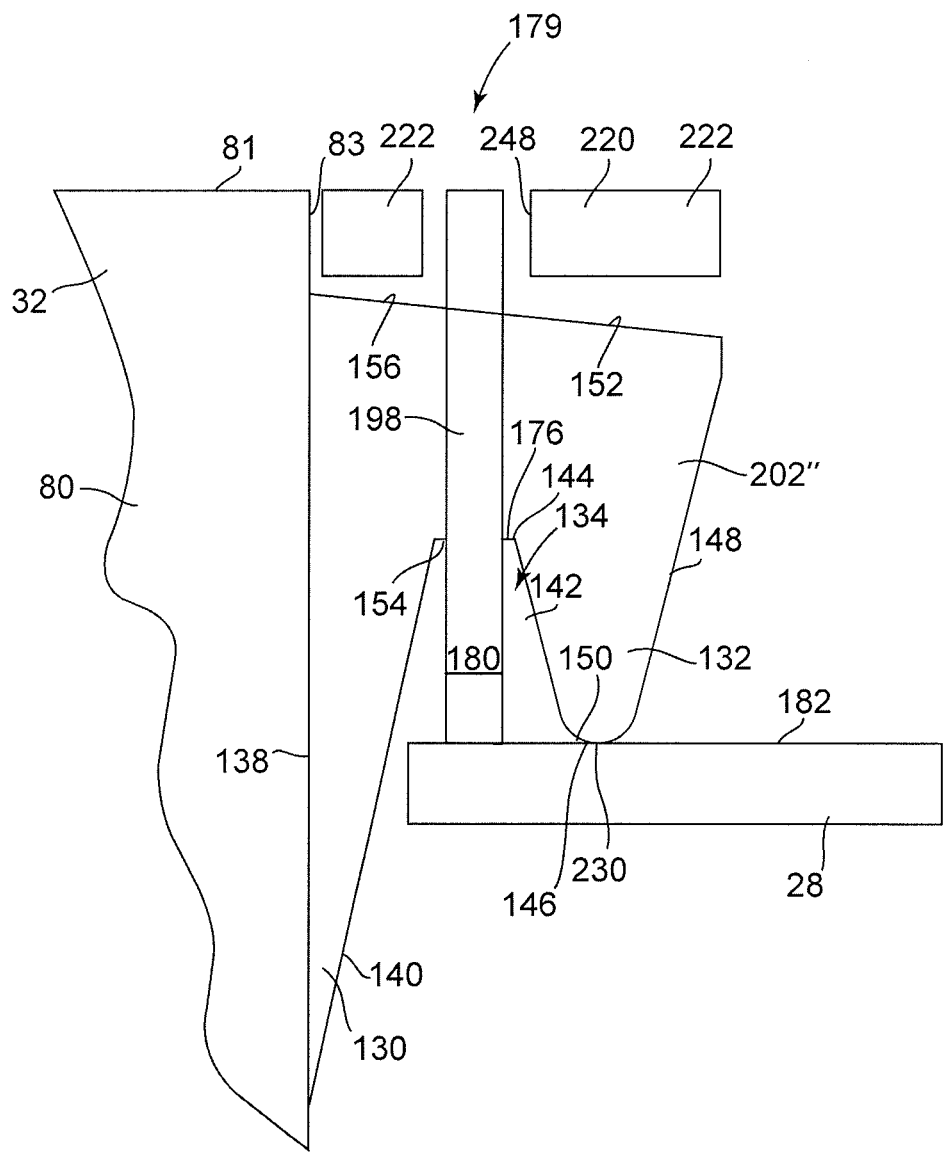
FIG. 14 is a view similar to FIGS. 6-8 and 10-12, but showing another embodiment of a gasket member, tube sheet, and clamp.

FIG. 14 illustrates another embodiment of gasket member 102". Gasket member 102" is generally identical in structure to gasket member 102 illustrated in FIGS. 6-8 and 10-12. As such, the gasket member 102" includes first gasket region 130, second gasket region 132, channel 134, attachment surface 138, first channel surface 140, second channel surface 142, tip 146, outer angled surface 148, apex 150, first axial gasket region 152, second axial gasket region 154, and straight surface 156.

In the embodiment of FIG. 14, the gasket member 102" further includes a protrusion-receiving hole 176. The hole 176 extends from the base 144 of the channel 134 all the way through to the first axial gasket region 156. It should be understood that the through hole 176 will not be a continuous hole all the way around the circumference of the filter element 32, but only in one or more portions of the gasket member 102". In addition, while the hole 176 in this embodiment is shown as going completely through the gasket 102", in other embodiments, the hole 176 will be a blind hole that only goes partially through the gasket member 102". Example uses for the hole 176 are described below in Section E.

D. Some Problems with Existing Systems

As mentioned above, in preferred implementations, the dust collector 10 and 10' will utilize a system for pulse cleaning the filter elements 32. In existing systems, it can be a problem if the media in the elements are not properly aligned with the pulse jet. If not aligned correctly, there will be less effective pulse cleaning done, and this results in a shorter filter life. Further, in existing systems, it can sometimes be difficult to properly install the elements against the tube sheet to get a good reliable seal.

E. Example Solutions

It has been found that filter elements are pulse cleaned more effectively when the media packs 80 are in alignment with the general direction of the pulse. It is advantageous if one can ensure that the filter elements 32 are properly installed in the collector housing 12 such that the media pack 80 is aligned with the general direction of the pulse. In addition, it is desirable to have a system which encourages the proper installation of filter elements 32 within the housing 12. It is desirable to properly install the filter elements 32 within the housing 12 so that a good and functioning seal is created between the filter element 32 and the tube sheet 28. Furthermore, it is desirable to increase the ease and speed for installation of filter elements 32, such that proper servicing is maintained.

To achieve one or more of these benefits, the tube sheet 28 has alignment structure 179 (FIG. 6) that cooperates with the gasket member 102 in ways that will align the filter element 32 relative to the jet 39 of the blowpipes 40 of the pulse cleaning; and will also encourage the proper sealing of the filter element 32 against the tube sheet 28.

Various embodiments of the tube sheet 28 are described below. In each of the embodiments, the tube sheet is shown as reference numeral 28, with the differences being shown by new reference numerals.

1. Example Alignment Structure 179

Figure 10:
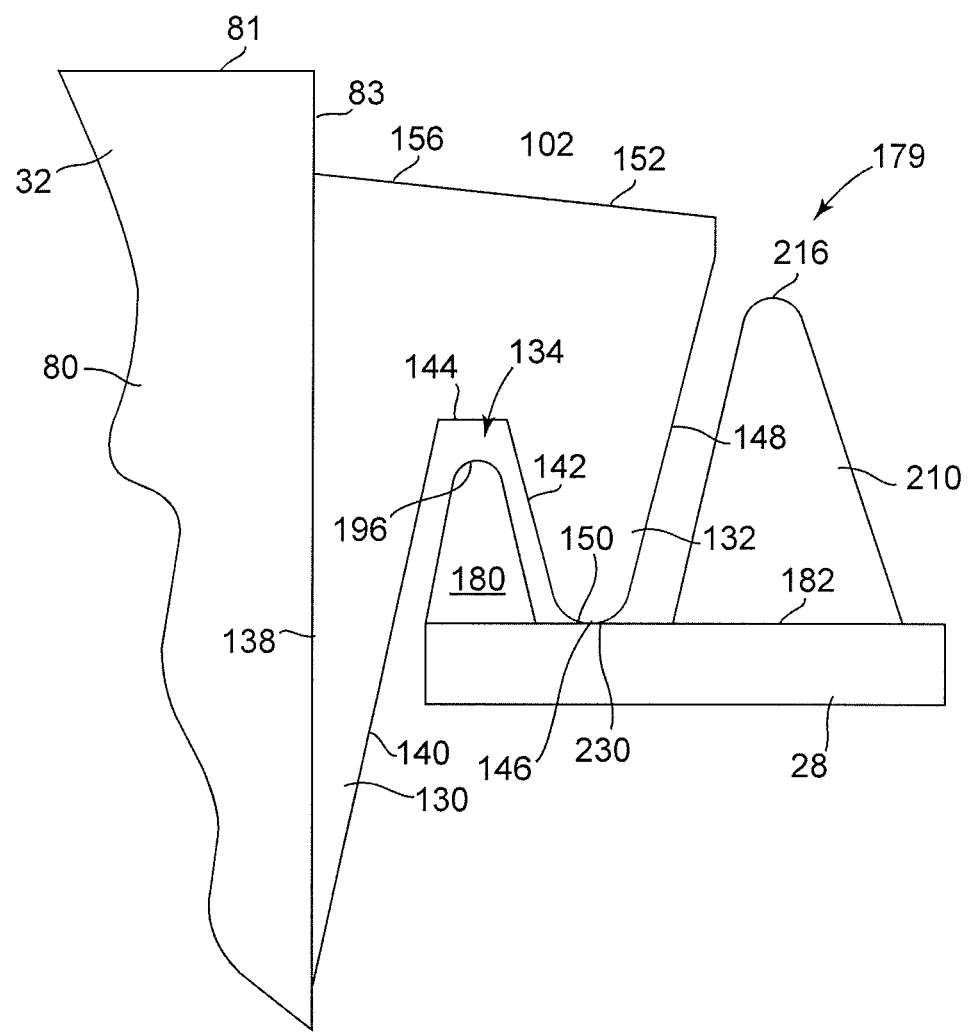
FIG. 10 is a view similar to FIGS. 6-8, but showing another embodiment of a tube sheet.
Figure 11:
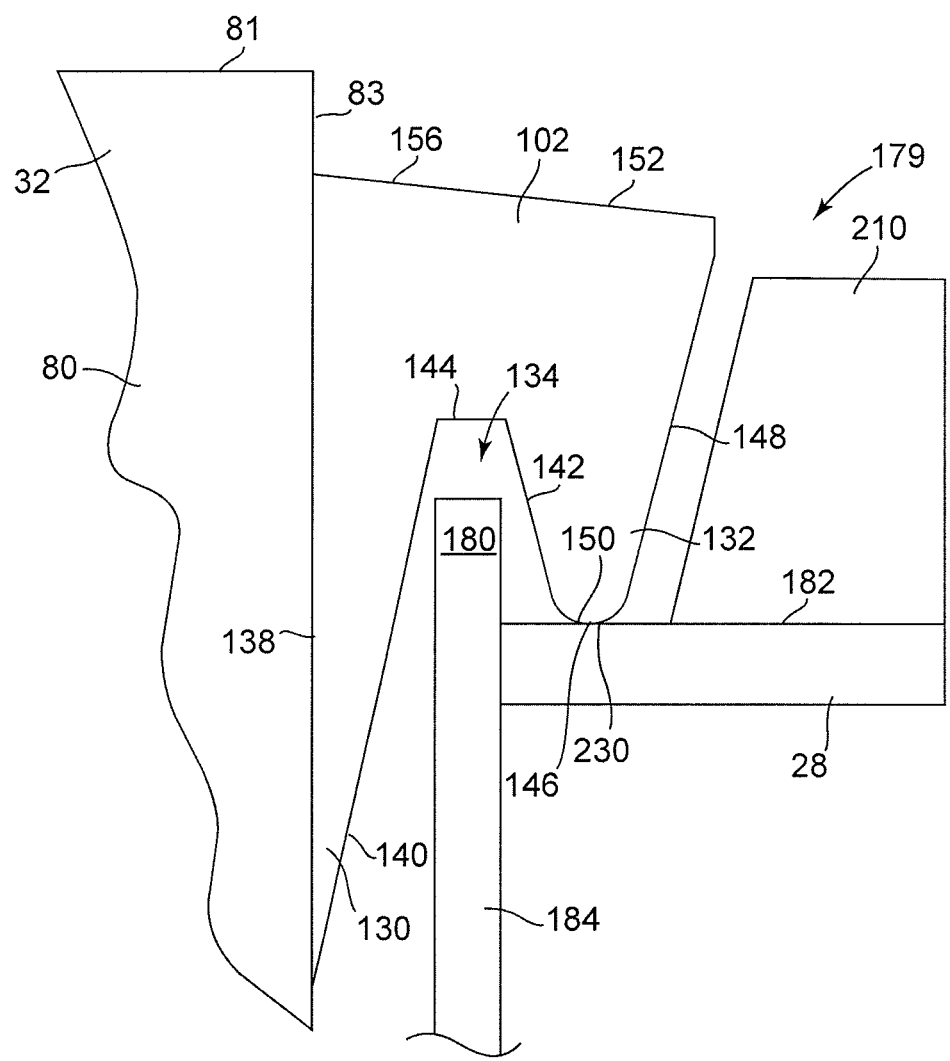
FIG. 11 is a view similar to FIGS. 6-8 and 10, but showing another embodiment of a tube sheet.
Figure 12:
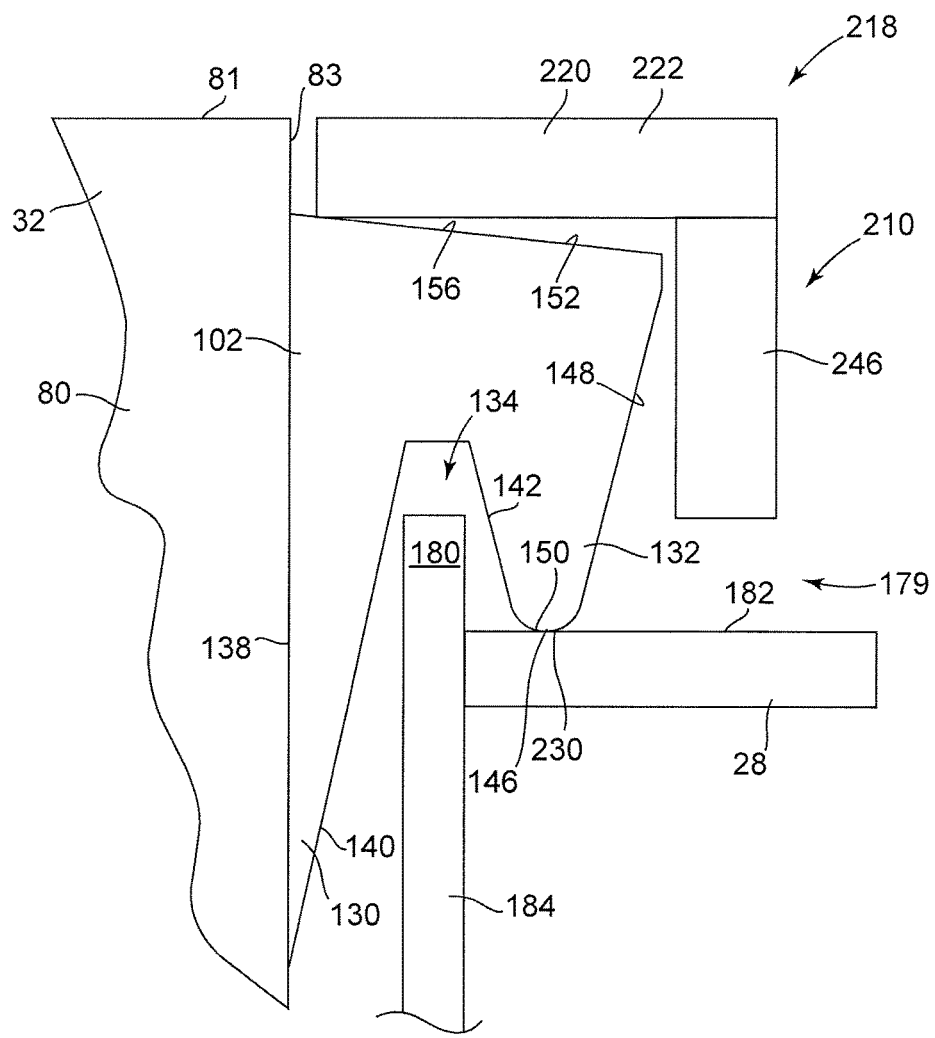
FIG. 12 is a view similar to FIGS. 6-8, 10, and 11, but showing another embodiment of a tube sheet and also depicting a clamp.

In each of the embodiments of FIGS. 6-14, 27 and 28, there is an example of alignment structure 179 embodied as at least one projection 180 angled relative to or above a plane 182 of the tube sheet 28. In preferred uses, the at least one projection 180 will extend from the plane 182 of the tube sheet 28 into the channel 134 of the gasket member 102, 102', 102", which helps to ensure proper alignment of the filter element 32 relative to the pulse jet 39. The projection 180 is not necessarily a part of the tube sheet 28, although it can be. In the embodiment of FIGS. 12 and 13, for example, the projection 180 is a part of the filter support 184, which helps to hold the filter element 132. The projection 180 is positioned relative to the channel 134 in the gasket member 102, 102', 102" such that the filter element 32 will not be properly oriented within the tube sheet 28 unless the projection 180 is lined up to fit within the channel 134. This helps to ensure properly alignment of the filter element 32 with the pulse jets 39.

Figure 6:
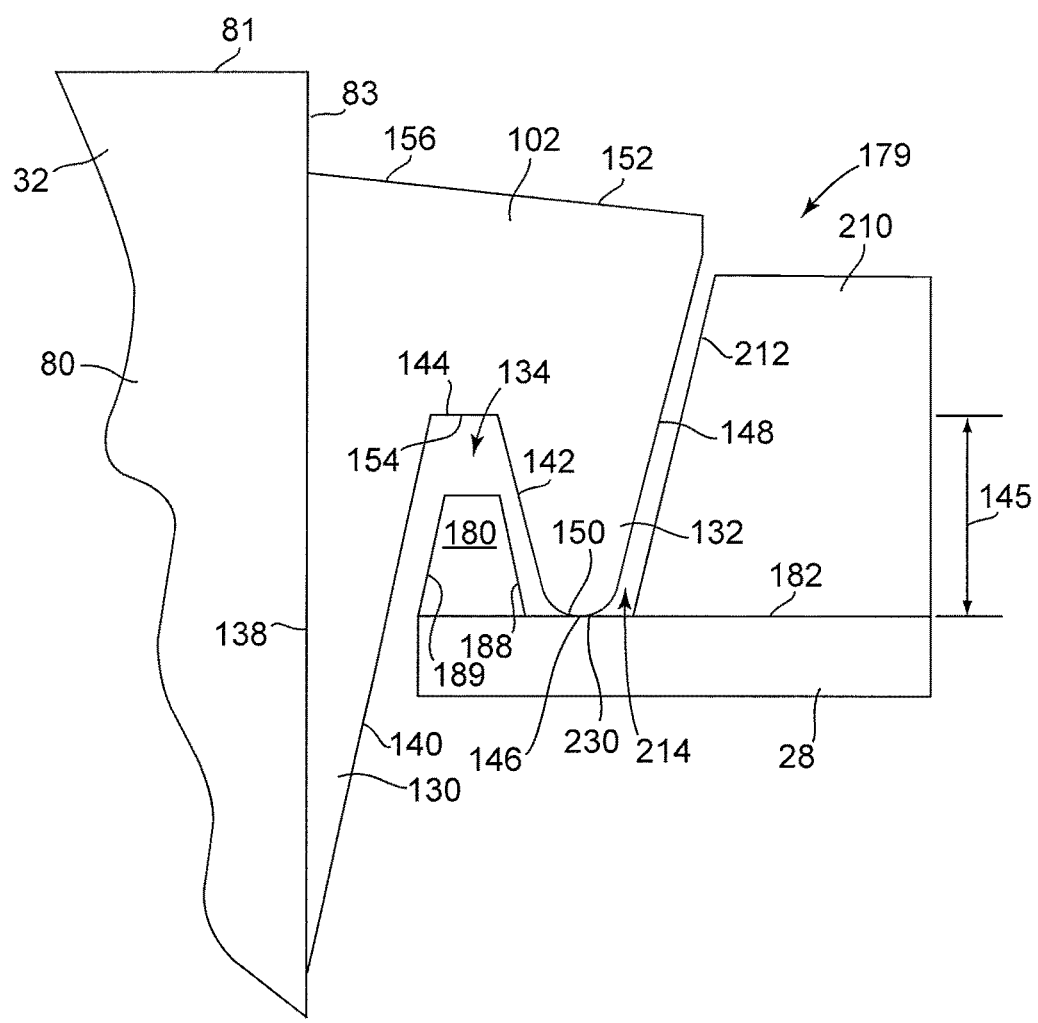
FIG. 6 is a schematic cross-sectional view of a portion of a filter element and tube sheet, constructed in accordance with principles of this disclosure.

In FIG. 6, the projection 180 is trapezoidal in shape as viewed from the cross-sectional side view of FIG. 6, including slanted wall 188 that slants, in FIG. 6, at a generally same angle as the second channel surface 142. In FIG. 6, the projection 180 further includes an opposite slanted wall 189 which in the embodiment shown, slants at a generally same angle as a first channel surface 140. The projection 180 can be solid, or it can have a through hole to save on material. In each of these embodiments, the projection 180 can include one or more through holes extending therethrough to save on material and weight. In FIG. 6, the projection 180, when viewed from a front view, can have a variety of shapes, including curved or rounded (see the example of FIG. 9, for instance.)

Figure 7:
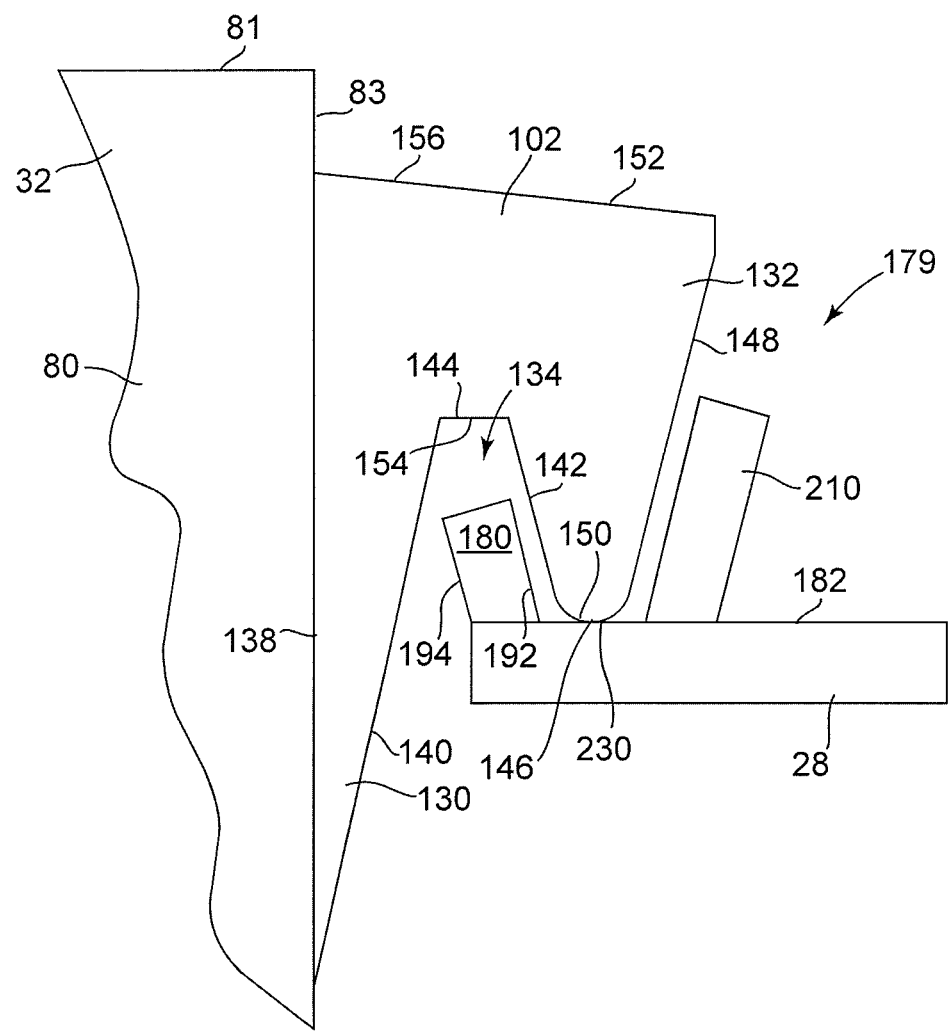
FIG. 7 is a drawing similar to FIG. 6, but showing another embodiment of a tube sheet.

In FIG. 7, the projection 180 is also trapezoidal in shape in the cross-section shown. In this embodiment, wall 192 and wall 194 are generally parallel. The wall 192 and wall 194 generally slope at the same angle as the second channel surface 142.

Figure 27:
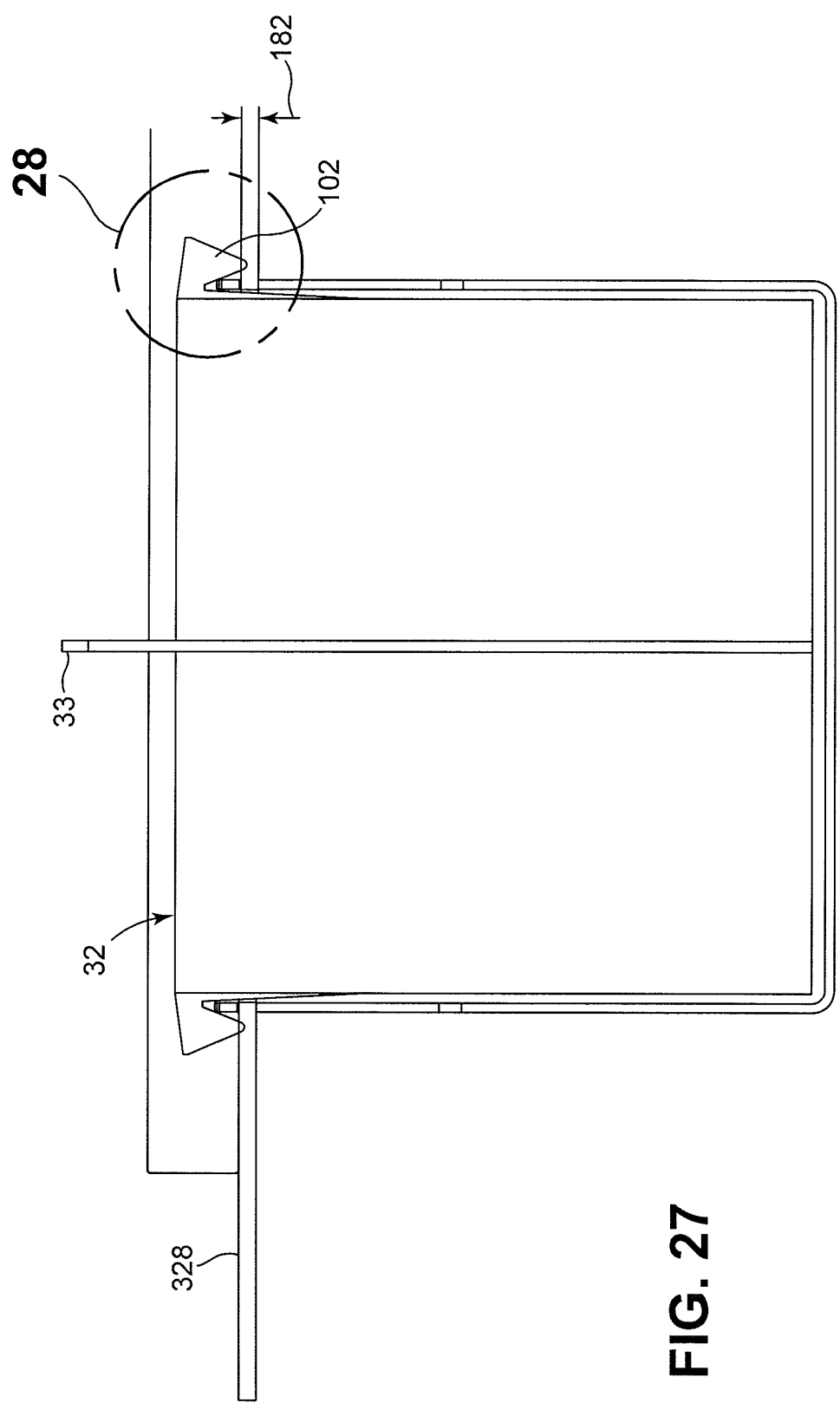
FIG. 27 is a schematic cross-sectional view of a filter element and tube sheet, constructed in accordance with the principles of this disclosure and as installed in a dust collector.
Figure 28:
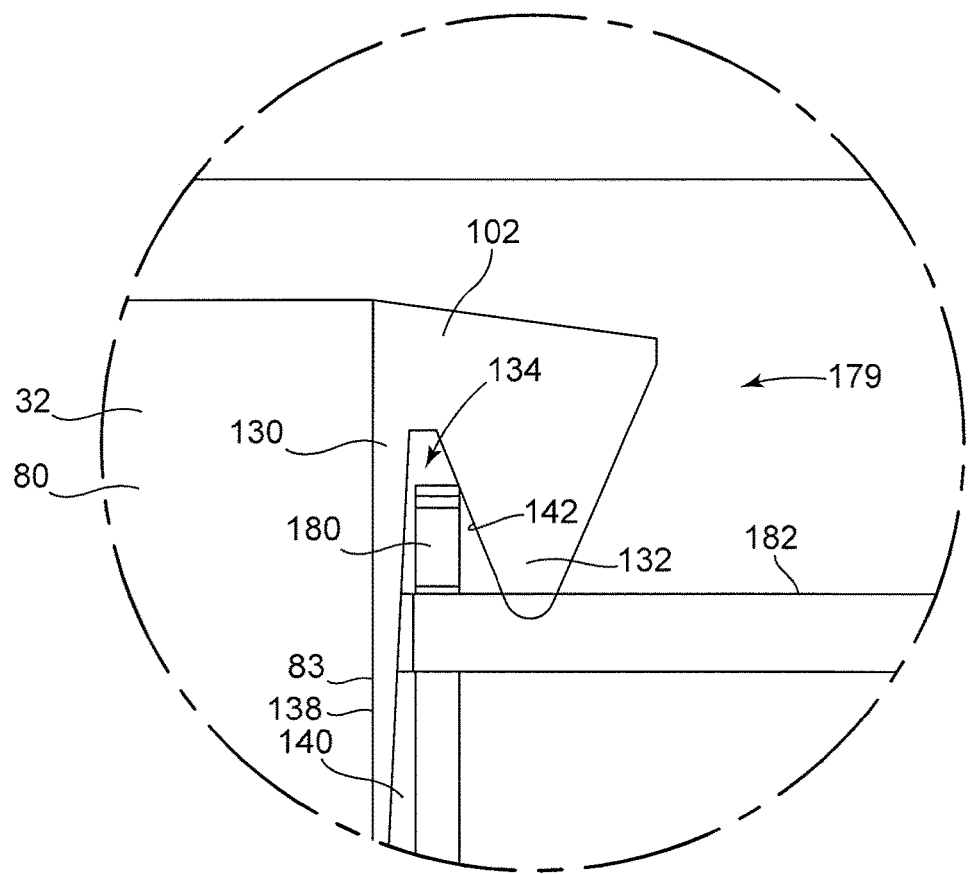
FIG. 28 is a schematic cross-sectional view of a portion of a filter element and tube sheet of FIG. 27, constructed in accordance with principles of this disclosure.

In FIGS. 8, 27 and 28, the projection 180 is generally rectangular in cross-section. FIG. 9 shows the projection 180 of FIG. 8 from a front view. It can be seen how the projection 180 has a rounded outer profile 202 but is viewed as rectangular in the view of FIG. 8. In FIG. 9, the projection 180 has a through hole 204. It should be understood that in each of the embodiments of FIGS. 6-8, 10-14 and 27-29, while the cross-sectional views of the projections 180 can show them as trapezoidal, rectangular, or triangular, the front views can have various profile shapes, such as rounded profile 202 as illustrated in FIG. 9.

In FIG. 10, the projection 180 is triangular in the cross-section depicted with a rounded end 196.

In FIGS. 11-13, the projection 180 is an extension of the filter support 184. In each of these embodiments, the projection 180 is generally rectangular, in the cross-section shown.

In FIG. 14, the projection 180 is shown as an elongated rectangular bar 198. The bar 198 extends through the hole 176. In embodiments where the hole 176 is only a blind hole and does not extend all the way through, then the bar 198 will be shorter and will only project up to the end of the hole 176.

The projection 180 can be embodied as a plurality of projections 180 extending around the openings 30 (FIG. 1) of the tube sheet 28. In addition, in some embodiments, there may be only a single projection 180 for selected ones of the openings 30 on the tube sheet 38.

In some example embodiments, the projection 180 extends into the channel 134 at least 25% of the height of the channel 134. In many embodiments, the projection 180 extends between 30%-90%, inclusive, of the height of the channel 134.

2. Example Protrusions 210

In the embodiments of FIGS. 6-8, 11, and 12 there is further provided at least one protrusion 210 extending at an angle (for example, perpendicular) to the plane 182 of the tube sheet 28 and being oriented laterally adjacent to the second gasket region 132. The protrusion 210 is not necessarily part of the tube sheet 28, although it can be. In FIG. 12, for example, the protrusion 210 is part of a clamp arrangement 218.

In the embodiment of FIG. 6, the protrusion 210 is located so that the second gasket region 132 is trapped between the projection 180 and the protrusion 210. In FIG. 6, the protrusion 210 has an angled wall 212 that is generally parallel to and at the same angle as outer angled surface 148. The protrusion 210 has a height greater than the height of the projection 180. In the embodiment of FIG. 6, this height is at least twice the height, and can be up to five times the height of the projection 180. By locating and arranging the protrusion 210 at this location on the tube sheet 28 relative to the projection 180, it helps the person install the filter element 32 properly and quickly within the tube sheet 28. That is, there is a location gap 214 between the projection 180 and the protrusion 210. This gap 214 is a convenient seat for locating the second gasket region 132 when orienting the filter element 32 in place.

In FIG. 7, the protrusion 210 is illustrated in the cross-sectional view as being trapezoidal. In this embodiment, the protrusion 210 is about half of the height of the second gasket region 132. In the embodiment of FIG. 6, the protrusion 210 is at least 75% of the height of the second gasket region 132.

In FIG. 8, the cross-sectional view of the protrusion 210 is shown as rectangular. In this embodiment, the protrusion 210 is taller than the projection 180 but it is less than twice the length of the projection 180. The protrusion 210 is between 30% and 60% of the height of the second gasket region 132.

In FIG. 10, the protrusion 210, in the cross-sectional elevational view has a triangular cross-section with a rounded end 216. In this embodiment, the protrusion 210 is between 60% and 95% of the height of the second gasket region 132.

In FIG. 11, the protrusion 210 is similar in structure as the protrusion 210 of FIG. 6.

In FIG. 12, the protrusion 210 is part of a clamp arrangement 218, described below.

3. Clamp Arrangement 218 and Further Example Protrusions

Figure 5:
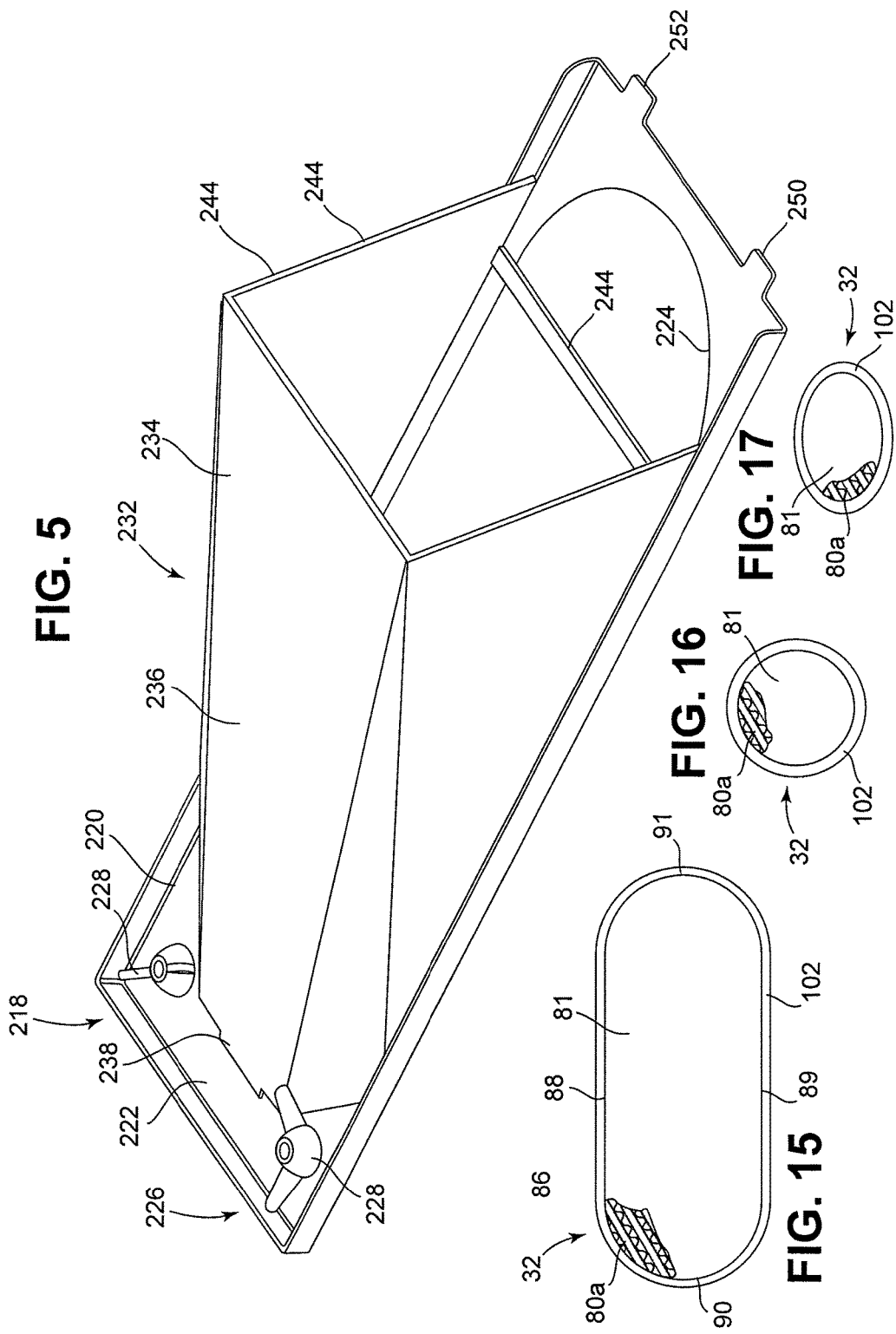
FIG. 5 is a perspective view of an accumulator utilized with the arrangement of FIG. 4.

Attention is next directed to FIGS. 4 and 5. In general, the system 10' includes a clamp arrangement 218 to axially compress the gasket member 102 to form a seal between and against the second gasket region 132 and the tube sheet 28. The clamp arrangement 218 can be various types of yokes, movable clamps, latches, etc. In the embodiment shown, the clamp arrangement 218 is shown as part of a filter element retainer 220 (FIG. 5). The retainer 220 includes a base plate 222 defining an opening 224. The opening 224 exposes one of the axial ends 81, 82 of the media pack 80. In the embodiment shown, the opening 224 exposes the downstream end 81 (FIG. 4).

A fastener arrangement 226 selectively connects the retainer 220 and the tube sheet 28. In the embodiment shown, the fastener arrangement 226 includes a pair of thumb screws 228 extending through the base plate 222. The screws 228 are received within the tube sheet 28. By tightening the thumb screws 228, an axial force is exerted against the base plate 222 and the gasket member 102 to form a seal 230 (FIGS. 6-8 and 10-14) between and against the gasket member 102 and the tube sheet 28. It should be understood that the schematic drawings of FIGS. 6-8 and 10-14 do not show the gasket member 102 compressed in the way it would appear when there is axial force to form the seal 230; rather, for purposes of clarity, the gasket member 102 is shown in its uncompressed state.

In the embodiment of the retainer 220 that is depicted, the base plate 222 includes tabs 250, 252 projecting therefrom. The tabs 250, 252 engage with slots 254 (FIG. 4) in the tube sheet 28 to help hold the elements 32 in operable orientation.

Still in reference to FIG. 5, in this embodiment of the retainer 220, there is an accumulator 232. The accumulator 232 is oriented to retain the pulse 39 of gas over the downstream axial end 81 of the media pack 80. This can be seen in FIG. 4. In the embodiment of FIGS. 4 and 5, the accumulator 232 includes a hood 234 secured to the base plate 222. The hood 234 includes a wall 236 extending above the opening 234 in the base plate 222. The wall 236 has an end 238 secured to the base plate 222. The wall 234 defines at an end 240 opposite of the end 238 an open mouth 242. The mouth 242 receives the jet 39 of gas pulsed from the pulsing arrangement.

Also as can be seen in FIG. 5, in this embodiment, the retainer 220 includes a bar 244 extending across the opening 224. The bar 244 helps to prevent the filter elements 32 from falling through the opening 224.

Attention is again directed to the embodiment of FIG. 12. In FIG. 12, a portion of the filter retainer 220 is viewable. In this particular embodiment, the filter retainer 220 further includes protrusion 210, shown as extension 246. The extension 246 extends from the base plate 222 in a direction toward the tube sheet 28. The extension 246 is oriented relative to the second gasket region 132 and the projection 180, such that the second gasket region 132 is located between the projection 180 and the extension 246. This extension 246 will help to ensure proper placement of the filter element 32 and the retainer 220.

In FIG. 13, in this embodiment, the retainer 220 includes extension member 250. The extension member 250 extends into and is received by the second channel 160. As such, the second gasket region 132 is properly located against the tube sheet 28 by ensuring that the channel 134 and the channel 160 receive the projection 180 and the extension member 250. In FIG. 13, the extension member 250 extends in a direction toward the tube sheet 28 from the base plate 222.

In FIG. 14, in this embodiment, the retainer 220 includes a slot or hole 248 in at least a portion of the base plate 222. The hole 248 receives the bar 198 of the projection 180. This helps to precisely locate the filter element 32 within its location against the tube sheet 28.

F. The Embodiment of FIGS. 18-23

Figure 18:
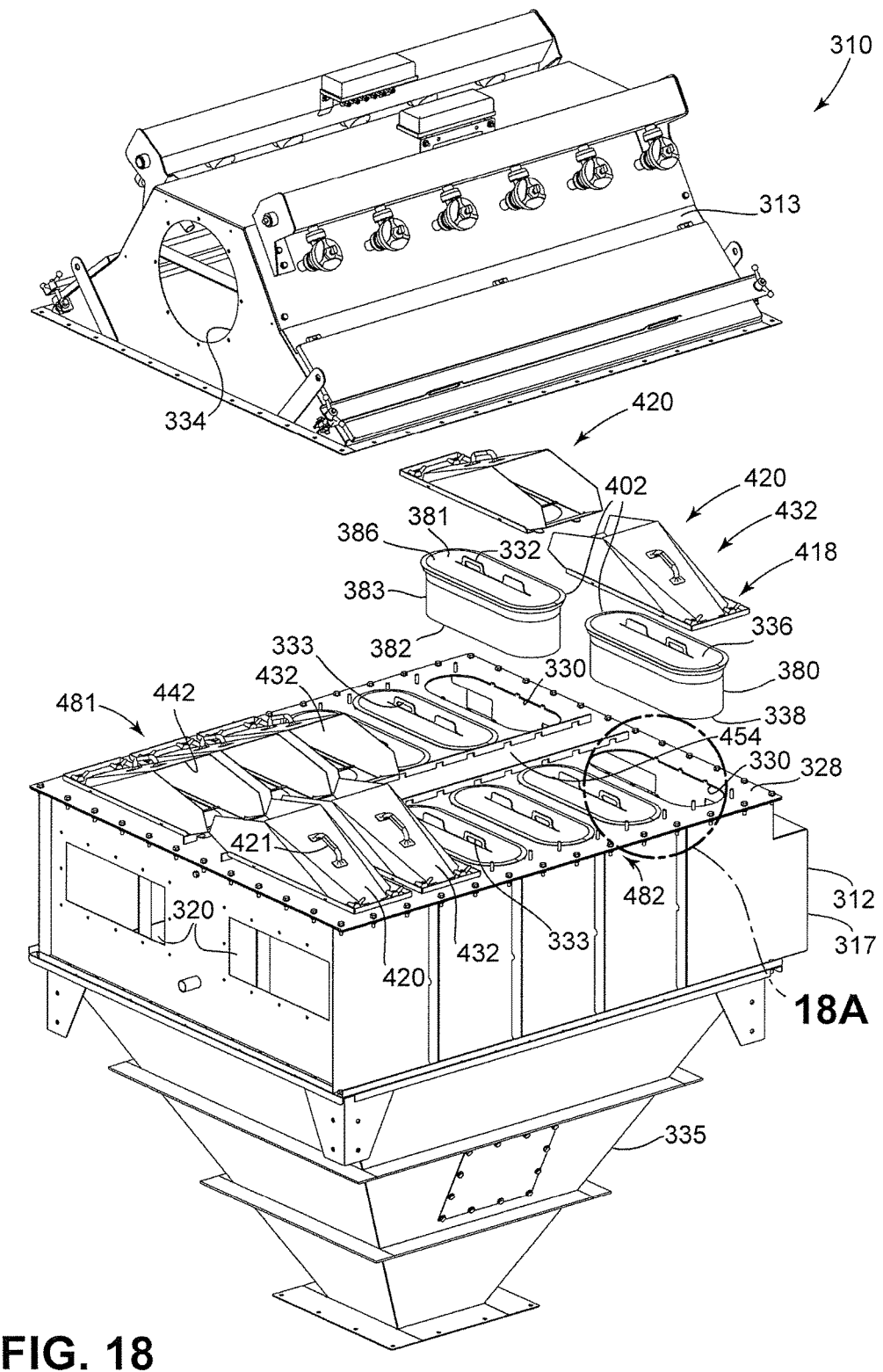
FIG. 18 is an exploded perspective of another embodiment of a dust collector system utilizing principles of this disclosure.

FIGS. 18-23 depict another embodiment of a dust collector 310. In FIG. 18, useful embodiments for the filter element 332 are illustrated. Filter element 332 includes a media pack 380 of Z-media, the definition of Z-media as characterized above in Section A. The media pack 380 has first and second opposite axial ends, or flow faces 381, 382, and a side (or side wall) 383 extending between the first and second flow faces 381, 382. In implementation, the first flow face 381 also corresponds to the downstream flow face 336, while the second flow face 382 corresponds to the upstream flow face 338.

In the embodiment shown, the media pack 380 includes a non-cylindrical pack of media that is a coiled construction 386. In alternative embodiments, the media pack 380 can be a construction of stacked Z-media. The stacked construction or the coiled construction 386 can have an overall cross-sectional shape that is oval (FIG. 17) or race track-shaped, and in the example shown in FIG. 18, the coiled construction 386 is race track-shaped. In the embodiment shown in FIG. 18, the filter elements 332 further include optional handles 333. The handles 333 extend from the downstream flow face 336 and can be part of a center core member, in which the media pack 380 is wound around (in the case of a coiled element) or mounted within (in the case of a stacked media element). The handles 333 can be shaped to define an opening sized to accommodate at least a portion of a human hand, so that fingers may be placed between the downstream flow face 336 and a portion of the handle 333. Upon grasping of the handle 333, the element 332 can be pulled from the opening 328 and removed from the housing 312.

In FIG. 18, the housing 312 defines a dirty air inlet 320, leading into a dirty air chamber 322 (FIG. 19). A tube sheet 328 operably holds a plurality of filter elements 332, which are removably oriented therein. The tube sheet 328 separates the dirty air chamber 322 from a clean air volume 315. There is a clean air outlet 334 and a air direction arrangement (not depicted) to direct air through the housing 312. A hopper 335 collects dirt and debris that falls by gravity from the filter elements 332. The housing 312 further includes a cover 313 that defines the clean air volume 315. The cover 313 mates with a body 317, the body 317 defining the dirty air chamber 322. The body 317, in the embodiment shown, is connected to the collection hopper 335. The cover 313 holds blowpipes 340, which are used to pulse gas periodically at the downstream flow face 336 in order to knock dirt and debris from the upstream side 338 of the filter elements 332 where it falls by gravity into the hopper 335, as explained above.

Figure 18A:
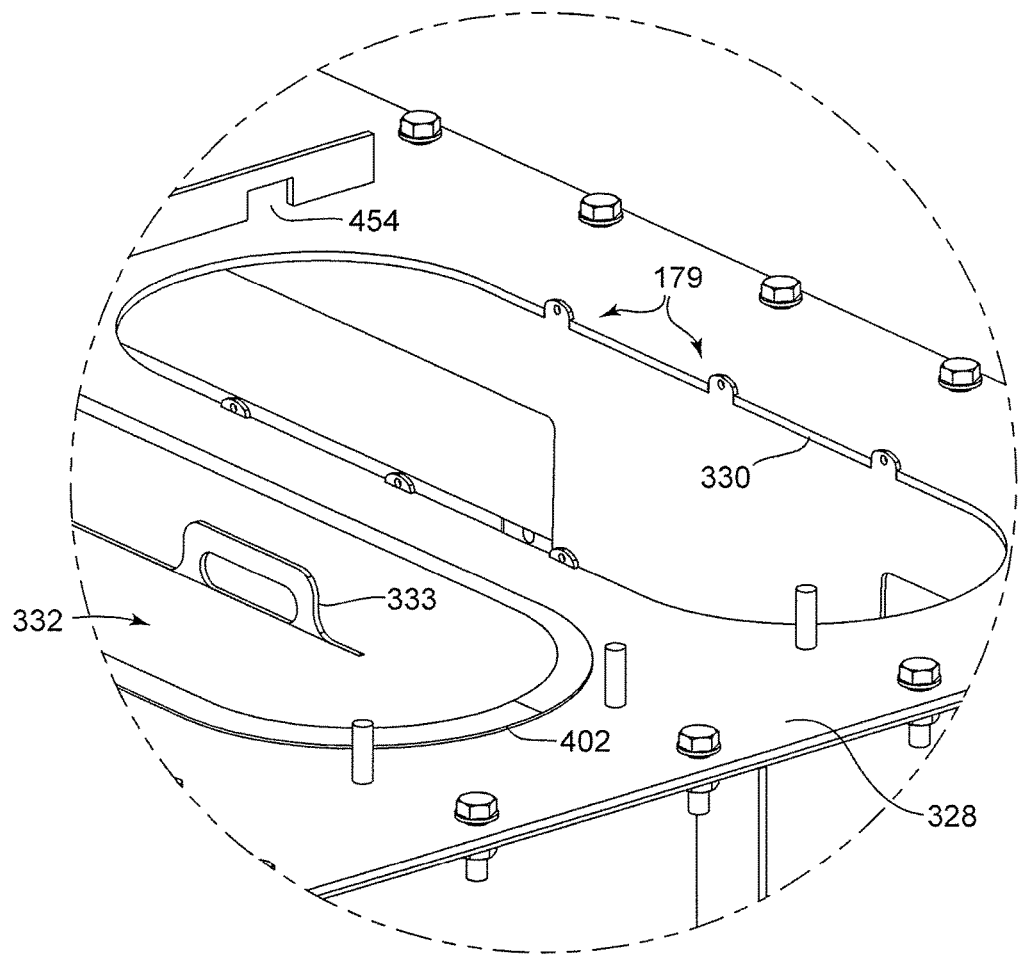
FIG. 18A is a close-up perspective view of one of the openings in the tube sheet of the dust collector embodiment shown in FIG. 18.
Figure 21:
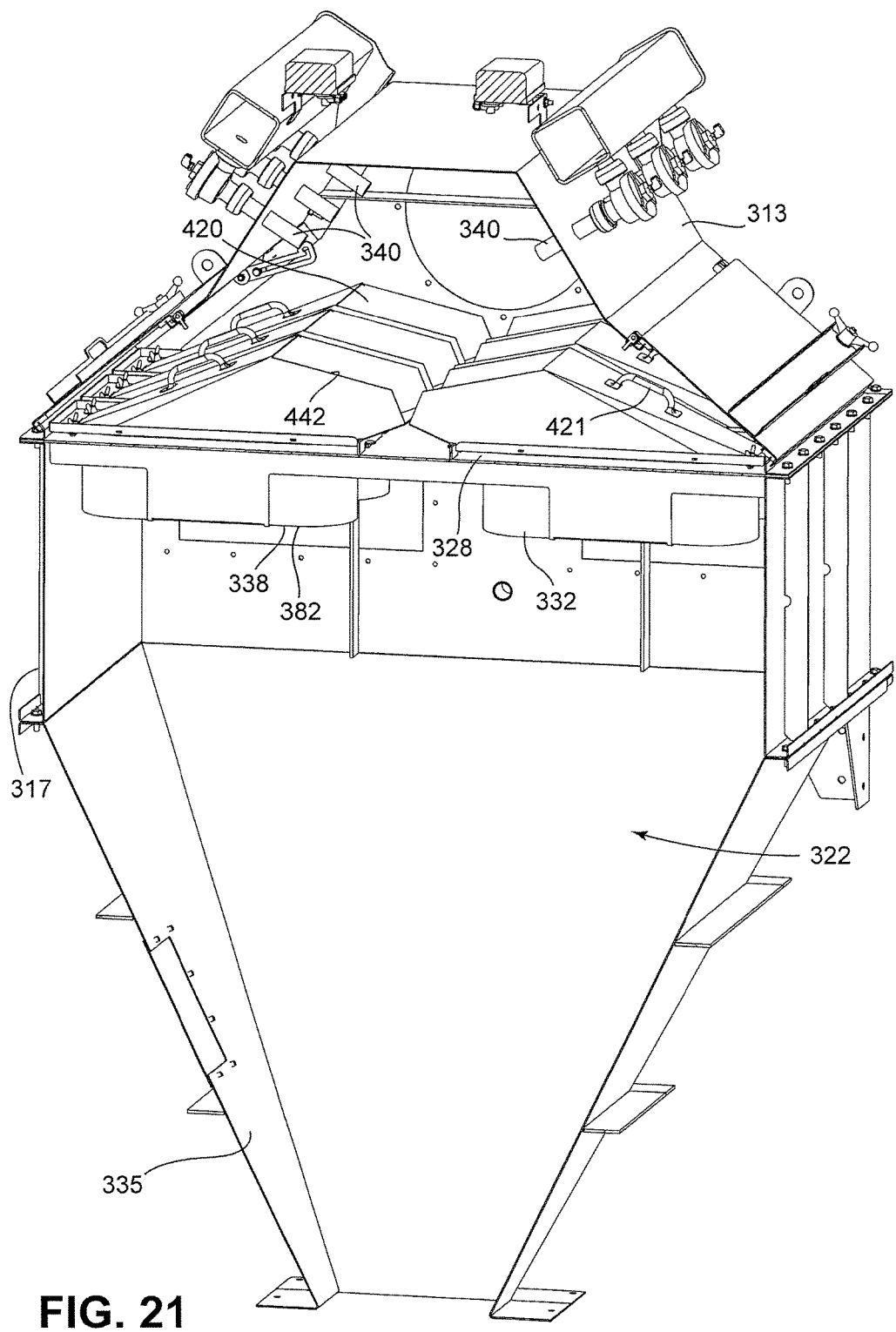
FIG. 21 is a perspective of the cross-sectional view of FIG. 20.
Figure 22:
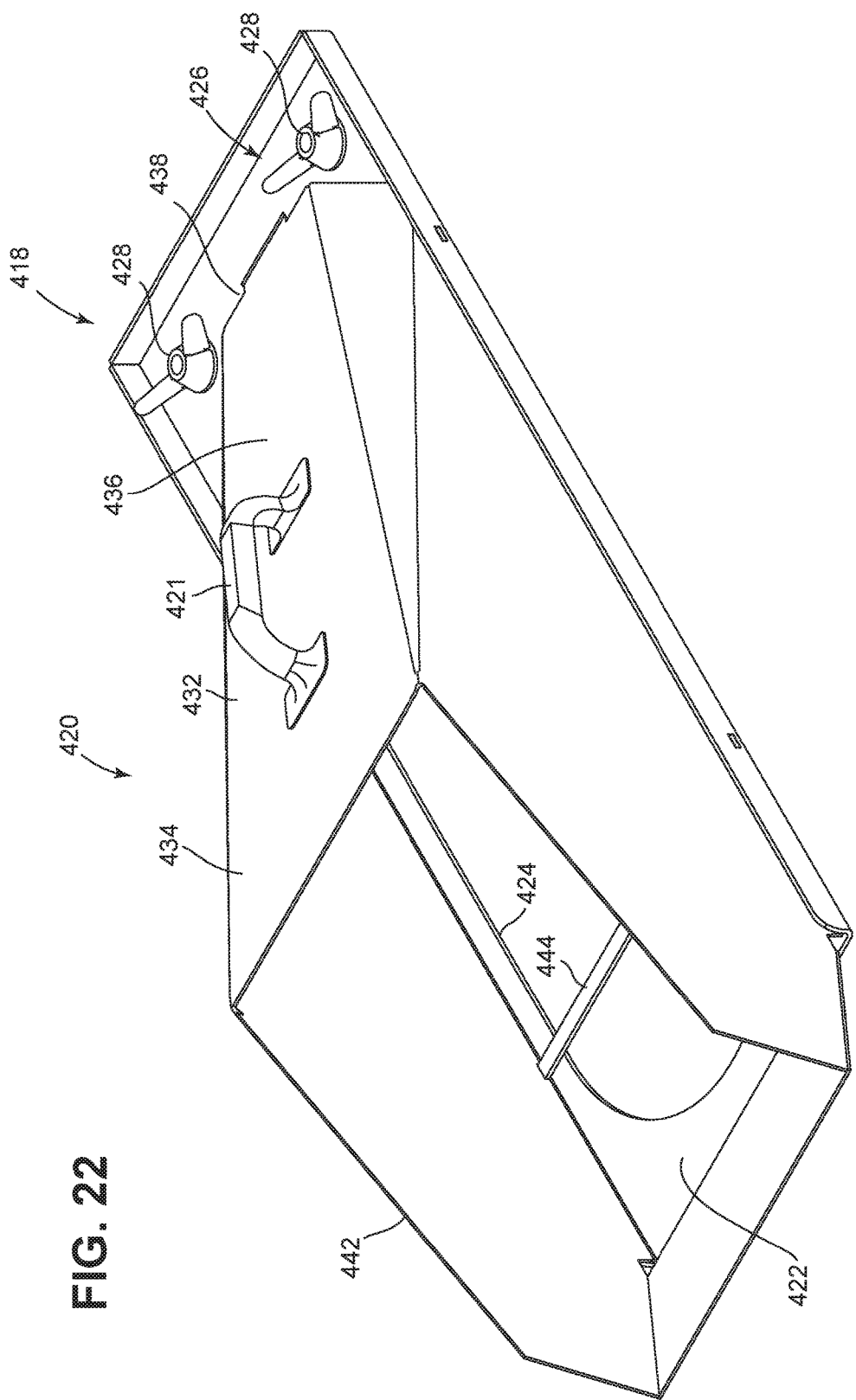
FIG. 22 is a perspective view of an accumulator utilized with the arrangement of FIGS. 18-21.
Figure 23:
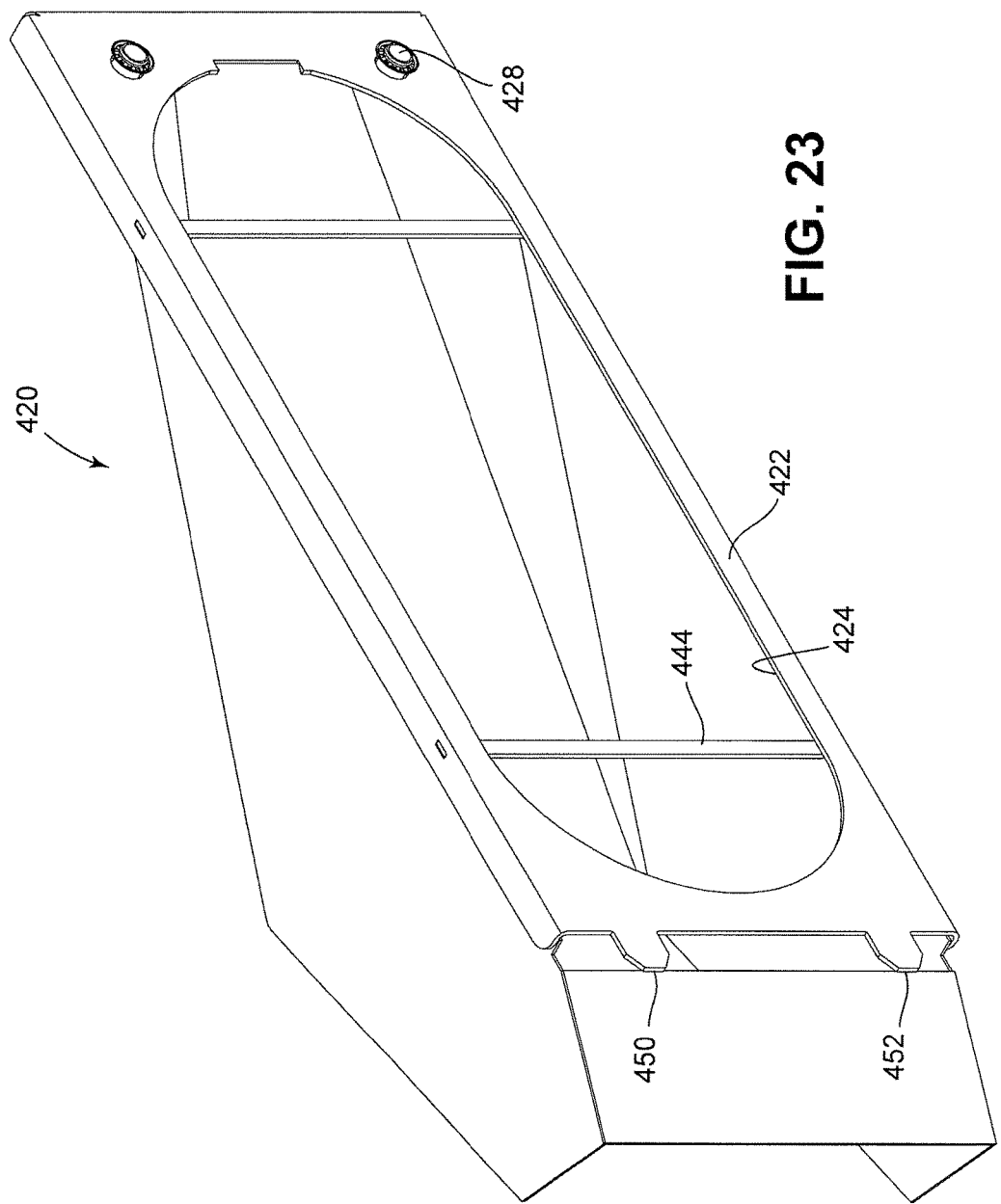
FIG. 23 is another perspective view of the accumulator of FIG. 22.

The tube sheet 328 defines a plurality of openings 330, in which the filter elements 332 are in intimate communication. In this embodiment, the filter elements 332 are arranged in two rows, 481, 482. For example, in the FIG. 18 embodiment, row 481 has 6 elements 332, while row 482 has 6 elements. In the embodiment shown, each of the element 332 has a respective blowpipe 340 aimed at its downstream flow face 336. The filter elements 332 are sealed against the tube sheet 328 by compression of gasket member 402 against the tube sheet 328. Refer also to FIG. 18A for a close-up perspective view of the embodiment in FIG. 18. The tube sheet 328 can have alignment structure 179 that cooperates with gasket 402, as discussed above and is incorporated by reference herein, in Section E.

The system 310 includes a clamp arrangement 418 to axially compress the gasket member 402 to form a seal between and against the gasket member 402 and the tube sheet 328. The clamp arrangement 418 can be various types of yokes, movable clamps, latches, etc. In the embodiment shown, the clamp arrangement 418 is shown as part of a filter element retainer 420. The retainer 420 includes a base plate 422 defining an opening 424. The opening 424 exposes one of the axial ends 381, 382 of the media pack 380. In the embodiment shown, the opening 424 exposes the downstream end 381.

A fastener arrangement 426 selectively connects the retainer 420 and the tube sheet 328. In the embodiment shown, the fastener arrangement 426 includes a pair of thumb screws 428 extending through the base plate 422. The screws 428 are received within the tube sheet 328. By tightening the thumb screws 428, an axial force is exerted against the base plate 422 and the gasket member 402 to form a seal between and against the gasket member 402 and the tube sheet 328.

In the embodiment of the retainer 420 that is depicted, the base plate 422 includes tabs 450, 452 projecting therefrom. The tabs 450, 452 engage with slots 454 in the tube sheet 328 to help hold the elements 332 in operable orientation.

In this embodiment of the retainer 420, there is an accumulator 432. The accumulator 432 is oriented to retain a pulse (such as pulse 39 in FIG. 4) of gas over the downstream axial end 381 of the media pack 380. In the embodiment shown, the accumulator 432 includes a hood 434 secured to the base plate 422. The hood 434 includes a wall 436 extending above the opening 434 in the base plate 422. The wall 436 has an end 438 secured to the base plate 422. The wall 434 defines at an end 440 opposite of the end 438 an open mouth 442. The mouth 442 receives the jet 39 of gas pulsed from the pulsing arrangement.

In the embodiment shown, the retainer 420 further includes a handle 421 to assist in moving and manipulating the retainer 420. In this embodiment, the handle 421 extends from the wall 436 and is sized to accommodate at least a portion of a human hand between the handle 421 and the wall 434. In use, the retainer may be lifted from the tube sheet 328 by grasping the handle 421, which provides access to the respective filter element 332.

In this embodiment, the retainer 420 includes a bar 444 extending across the opening 424. The bar 444 helps to prevent the filter elements 332 from falling through the opening 424.

G. The Embodiment of FIGS. 24-26

Figure 24:
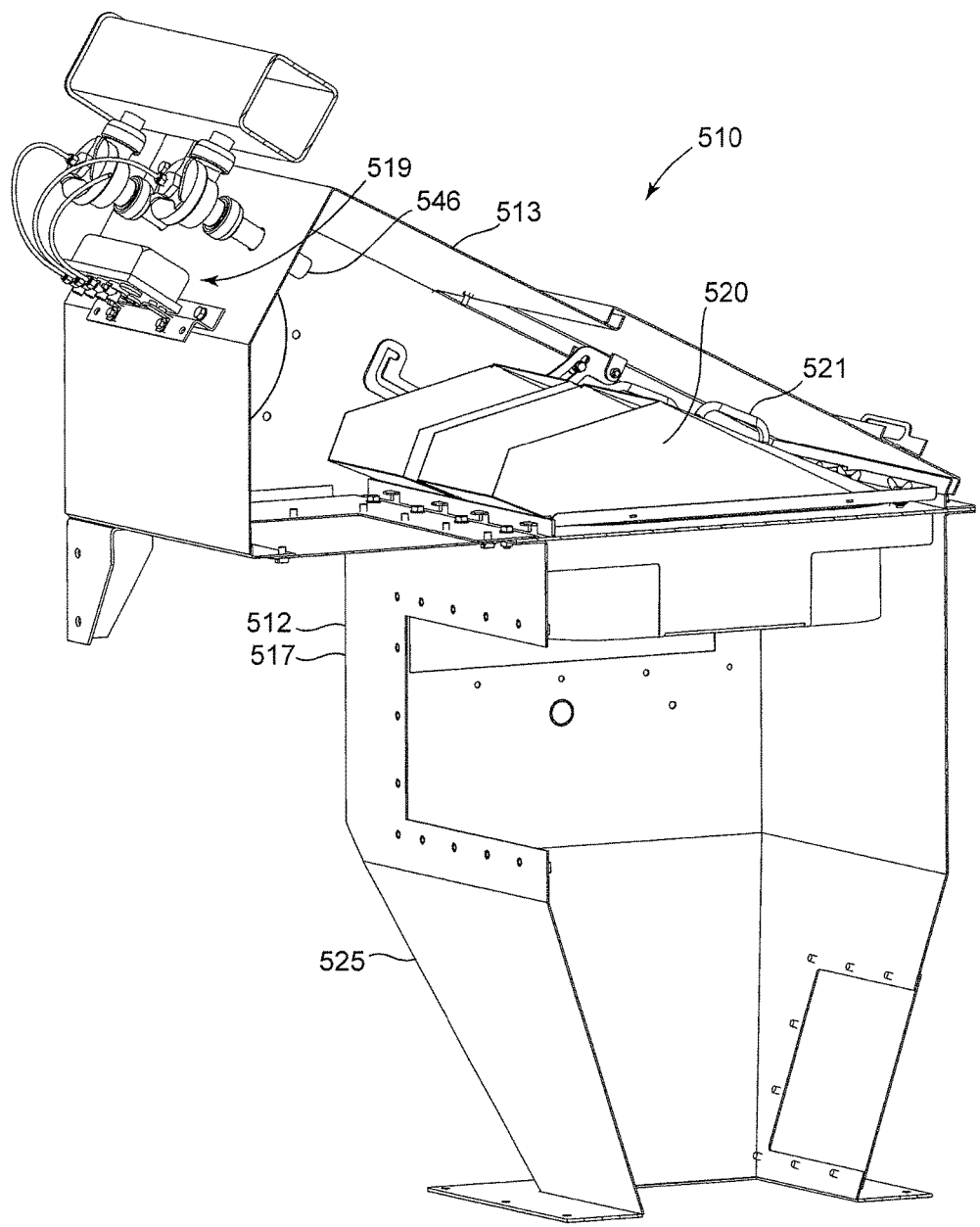
FIG. 24 is a perspective, cross-sectional view of another embodiment of a dust collector system utilizing principles of this disclosure, the cross-section being taken along the line A-A of FIG. 25.
Figure 25:
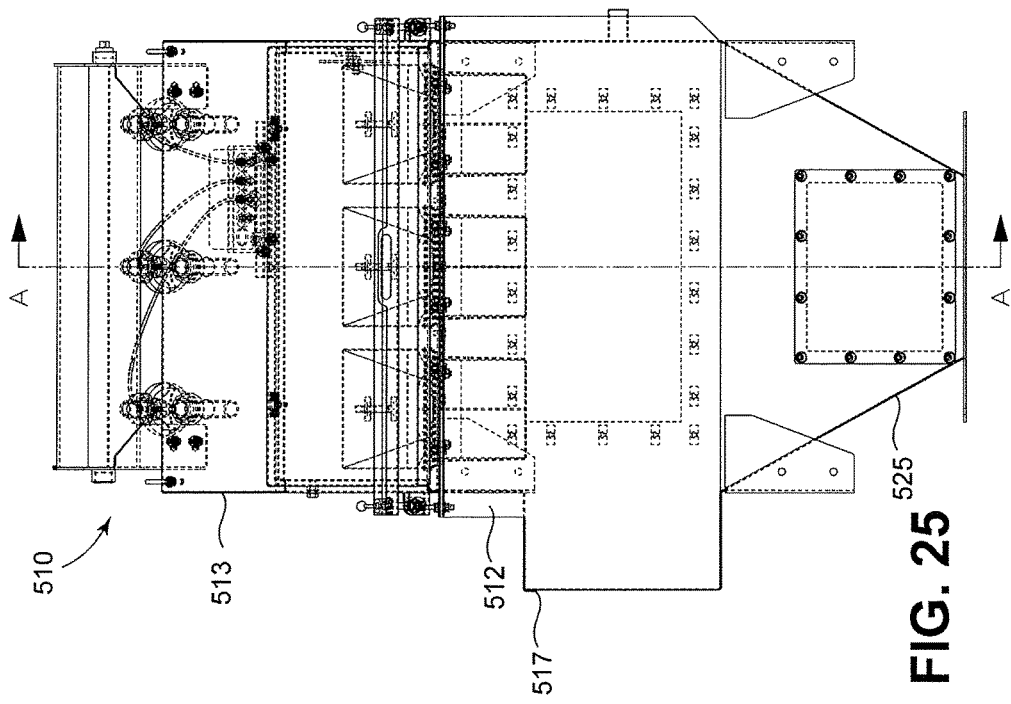
FIG. 25 is a front elevational view of the dust collector system of FIG. 24.
Figure 26:
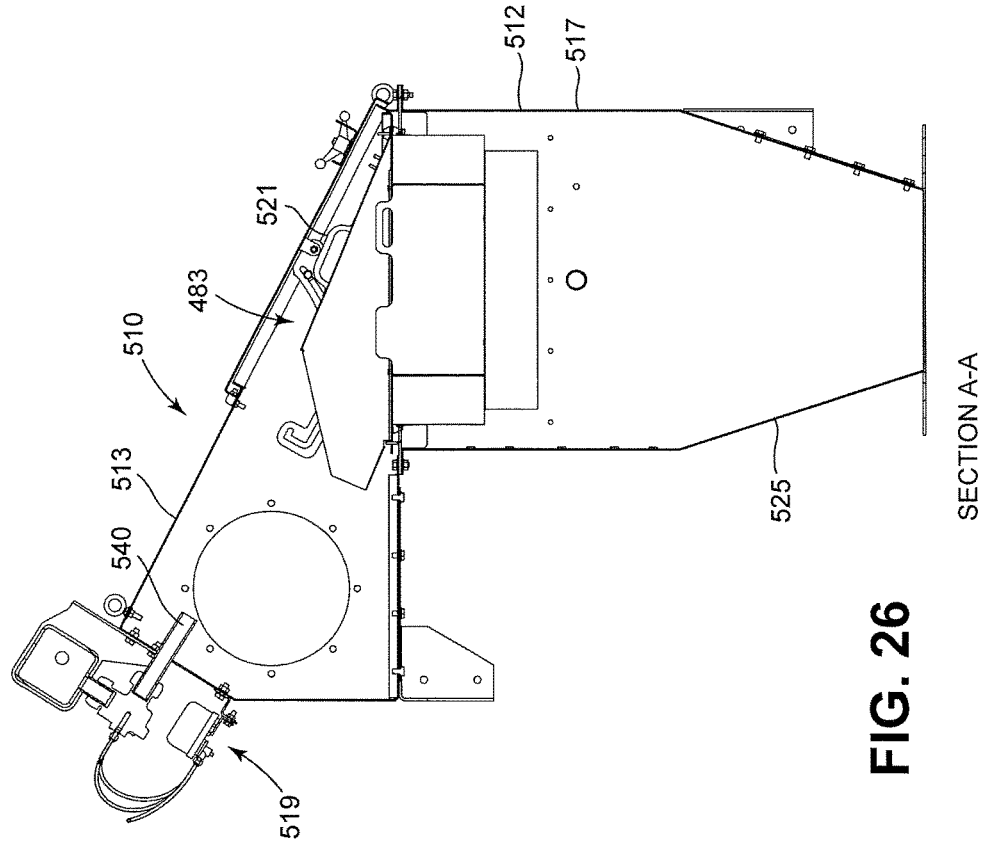
FIG. 26 is a cross-sectional view of the dust collector system of FIGS. 24 and 25, the cross-section being taken along the line A-A of FIG. 25.

In FIGS. 24-26, another embodiment of a dust collector is depicted at 510. Dust collector 510 is analogous to collector 310, except that it is half of the size. Instead of having two rows 481, 482 of filter elements 332, there is just a single row 483.

The dust collector 510 includes housing 512 having a body 517 and a cover 513. The body 517 has with a dust collection hopper 525. The cover 513 holds the gas pulse compressor having blow pipes 540 to emit pulses, as described above.

In FIGS. 24 and 26, retainers 520, each which may have a handle 521 can be seen. The retainers help to hold and form a seal with elements 332, described above.

H. Methods

A method of servicing the dust collector 10, 10', 310, 510 can be practiced utilizing these arrangements. The following methods will make reference to the reference numerals used in the embodiments of FIGS. 1-17, but it will be readily understood by those skilled in the art that these methods apply to the embodiments of FIGS. 18-26, as well. In such methods, a first filter element 32 is removed from the tube sheet 28 in the housing 12. A second filter element 32 is provided. This second filter element 32 is sealed against the tube sheet 28 by orienting at least one projection 180 extending relative to plane 182 of the tube sheet 28 into the channel 134 defined by the gasket member 102. The gasket member 102 is secured to the filter element 32. An axial force is exerted against the gasket member 102 to form seal 230 between the gasket member 102 and the tube sheet 28. The step of sealing includes orienting the second filter element 32 to align the at least one projection 180 with the channel 134 defined by the gasket member 102 such that the media pack 80 in the second filter element 32 is aligned for receiving a pulse jet through a downstream side of the second filter element 32.

The step of sealing can further include orienting the second filter element 32 such that a portion of the gasket member 102 is oriented between the projection 180 and protrusion 210.

Methods of filtering include drawing air into the dust collector through dirty air inlet 20, into an unfiltered air volume 22, through at least one filter element 32 sealed against tube sheet 28, into the clean air volume 15, and then out through the clean air outlet 34. The at least one filter element 32 includes gasket member 102 forming the seal 230 with the tube sheet 28. The gasket member 102 defines channel 134, and there is projection 180 extending from the tube sheet 28 that is oriented within the channel 134.

I. The Embodiment of FIGS. 29-34

Figure 29:
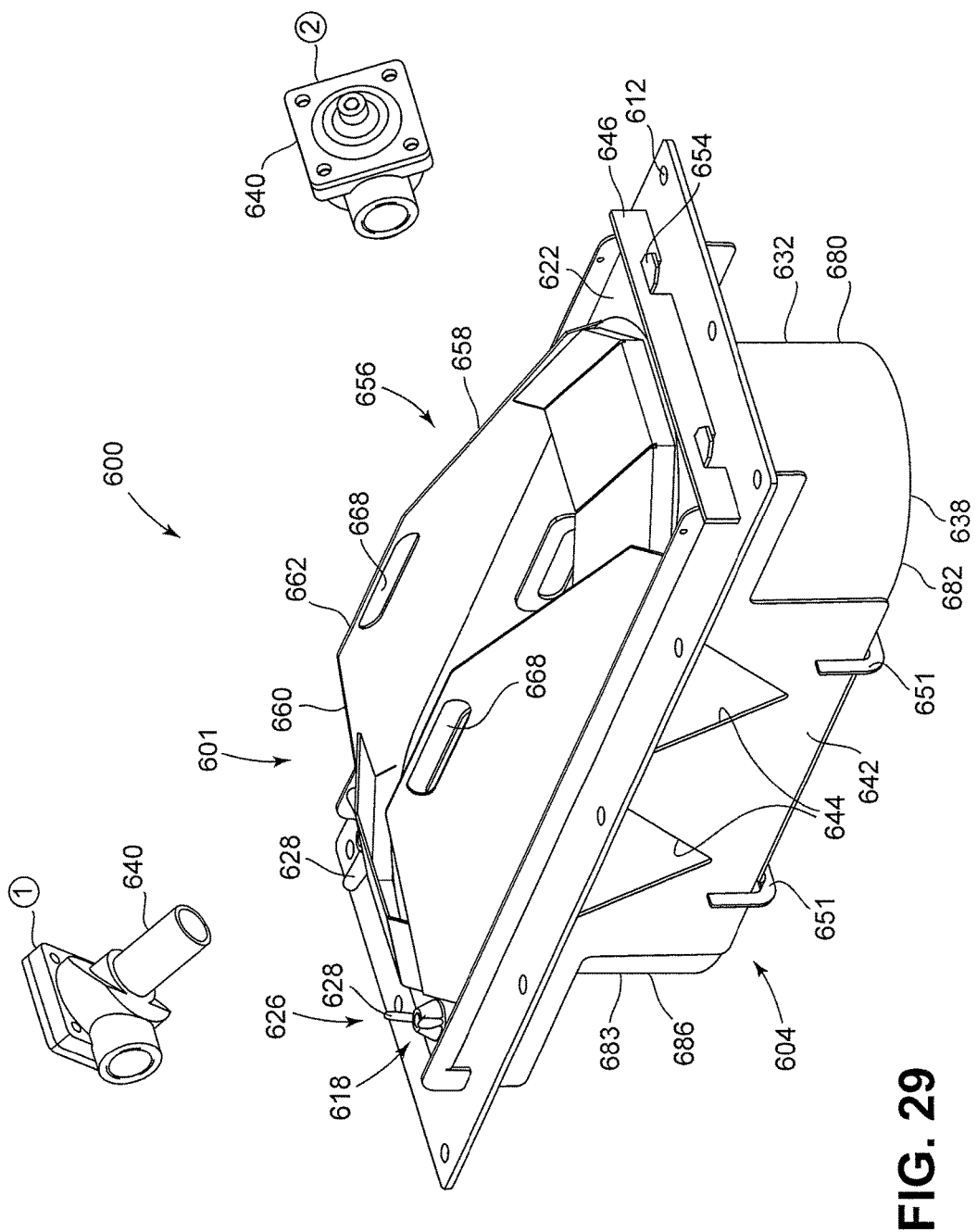
FIG. 29 is a schematic, perspective view of another embodiment of a filter element removably secured within a filter retainer having an accumulator, constructed according to principles of this disclosure.

In FIGS. 29-34, another arrangement is depicted schematically at 600. It should be understood that arrangement 600 can be used in an appropriate sized and shaped dust collector, such as the collector 310. The methods described above can be used with this embodiment, as well as the embodiment of FIGS. 35-40. In FIG. 29, blow pipes 640 are shown in perspective view, but are depicted schematically. That is, the blow pipes 640, of course, would need to be connected to the dust collector housing. FIG. 29 depicts them schematically as they would be oriented at an angle relative to the assembly 601. The angle of the blow pipes 640 relative to the filter element 632 downstream flow face 636 (FIG. 30) can be determined as described in connection with FIG. 2, above.

Figure 30:
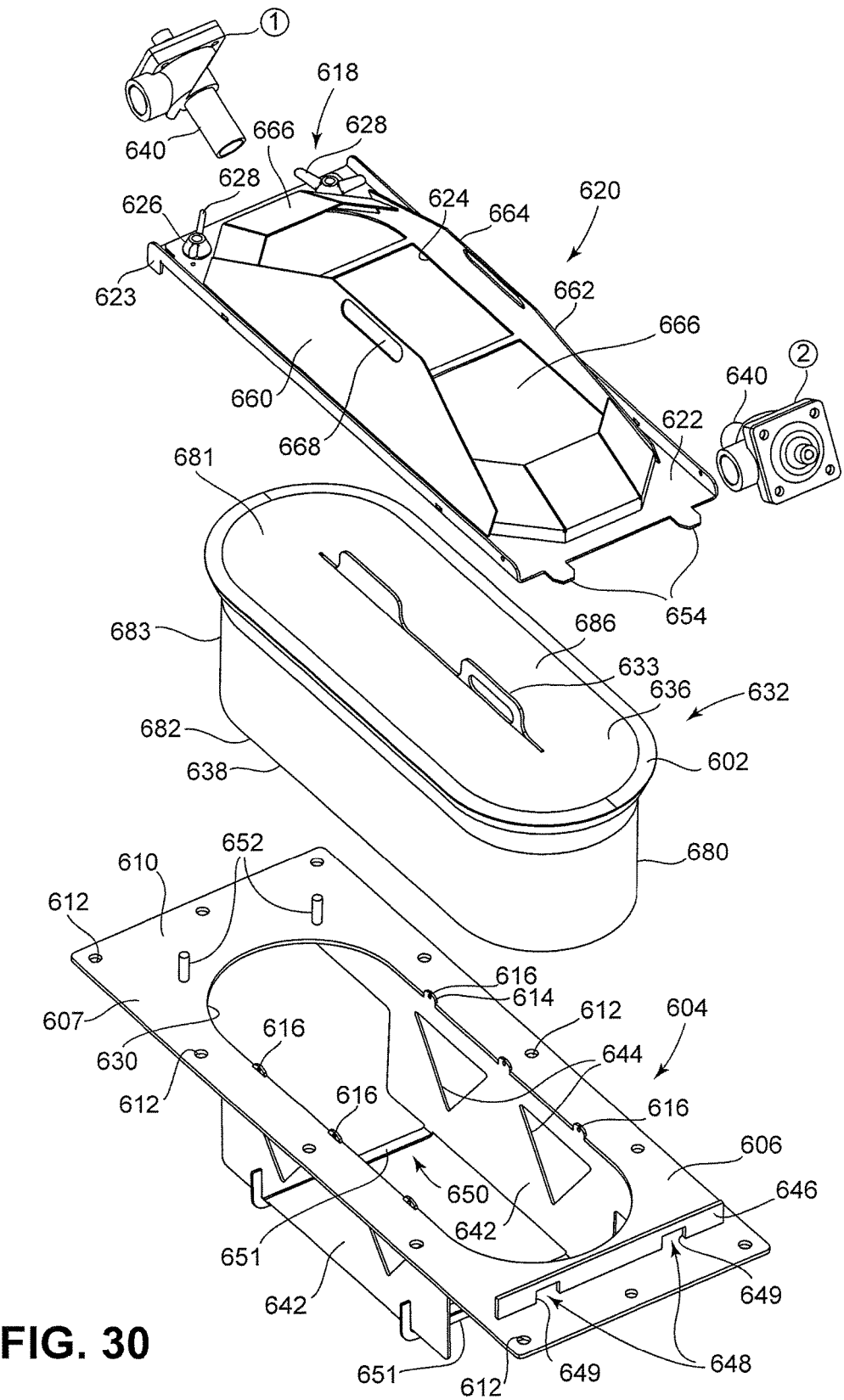
FIG. 30 is an exploded perspective view of the arrangement of FIG. 29.

In FIGS. 29 and 30, filter element 632 can be seen. Filter element 632 includes a media pack 680 of Z-media, the definition of Z-media as characterized in Section A. The media pack has first and second opposite axial ends or flow faces 681, 682 and a side (or side wall) 683, extending between the first and second flow faces 681, 682. In implementation, the first flow face 681 also corresponds to the downstream flow face 636, while the second flow face 682 corresponds to the upstream flow face 638.

In the embodiment shown, the media pack 680 includes a non-cylindrical section of filter media that is rolled or otherwise formed into a coiled construction 686. In alternative embodiments, the media pack 680 can be a construction of stacked Z-media. The stacked construction or the coiled construction 686 can have an overall cross-sectional shape that is oval (FIG. 17) or racetrack shaped. In the example shown in FIG. 30, the coiled construction 686 is race-track shaped. Of course, in other embodiments, the media pack 380 can be other shapes including round, rectangular with rounded corners, or other polygons.

In the embodiment shown in FIG. 30, the filter element 632 further includes at least one optional handle 633. In the example of FIG. 30, there are two optional handles 633. The handles 633 are shown extending from the downstream flow face 636 and may be part of a center core member, in which the media pack 680 is wound around (in the case of a coiled element) or mounted within (in the case of a stacked media element). The handle 633 can be shaped to define an opening sized to accommodate a portion of a human hand, so that fingers may be placed between the downstream flow face 636 and a portion of the handle 633. Upon grasping the handle 633, the element 632 can be pulled from the opening 630 (FIG. 30) and removed from the assembly 601.

As with previous embodiments, the blow pipes 640 are used to pulse gas periodically at the downstream flow face 636 in order to knock dirt and debris from the upstream side 638 of the filter element 632.

In the embodiment of FIGS. 29-34, the arrangement 600 includes a holder 604. The holder 604 is constructed for receiving and holding the filter element 632 in place in the dust collector housing. In some embodiments, the holder 604 can be built in and be an integral part of the collector housing. In some embodiments, the holder 604 can be a separate piece which is then secured to the collector housing. In the embodiment shown, the holder 604 includes a member 606 defining surface 607. In implementation, the surface 607 functions as the tubesheet 608. In the embodiment shown, the member 606 forms a frame 610 defining an opening 630. The filter element 632 is operably fitted within and removed from the holder 604 through the opening 630. In this embodiment, the frame 610 defines a plurality of holes 612, which can receive screws or other fasteners to secure the holder 604 to a remaining portion of the dust collector housing.

The holder 604 includes alignment structure 614, such as alignment structure 179, discussed above, to cooperate a gasket 602 on the filter element 632. In the embodiment shown in FIG. 30, the alignment structure 614 includes a plurality of protrusions 616 extending axially from the surface 607 of the member 606 and lining the perimeter of the opening 630. These protrusions 616 cooperate with the gasket 602 as discussed above and incorporated by reference herein in Section E.

Still in reference to FIG. 30, the holder 604 includes a pair of side panels 642 extending from the member 606 and along the perimeter of the opening 630. The side panels 642 help to hold the filter element 632 along the side wall 633 of the element 632. In the embodiment shown, the side panels 642 generally extend the length of the side wall between the first flow face 681 and second flow face 682, when the filter element is operably installed in the holder 604. The side panels 642 can define openings 644 for saving material cost or for creating a window such that it is visible from the side whether the filter element 632 is installed within the holder 604.

Again, still in reference to FIG. 30, the holder 604 has an upwardly extending flange 646 that axially protrudes from the surface 607 of the member 606. The flange 646 defines a slot arrangement 648 that is used to engage with structure on the retainer 620, described further below. In this embodiment, the slot arrangement 648 includes a pair of slots 649. Of course, other arrangements could be made.

Still in reference to FIG. 30, the holder 604, in this embodiment also includes a bar arrangement 650 that is useful in supporting the filter element 632 in place within the holder 644. The bar arrangement 650, in this embodiment, includes at least one bar 651 and in the embodiment depicted, two bars 651 that extend between the side panels 642. The bars 651 contact the upstream flow face 638 of the filter element 632 when the filter element 632 is operably oriented within the holder 604.

A clamp arrangement 618 is provided to axially compress the gasket member 602 to form a seal between and against the gasket member 602 and the surface 607 of the member 606 of the holder 604. The clamp arrangement 618 can be various types of yokes, movable clamps, latches, etc. In the embodiment shown, the clamp arrangement 618 is shown as part of the filter element retainer 620. The retainer 620 includes a base plate 622 defining opening 624. The opening 624 exposes the downstream flow face 636 of the media pack 680.

A fastener arrangement 626 selectively connects the retainer 620 and the holder 604. In the embodiment shown, the fastener arrangement 626 includes a pair of thumb screws 628 extending through the base plate 622. The screws 628 are received by the holder 604. In the embodiment of FIG. 30, the holder 604 can include posts 652 for aligning with and receiving the thumb screws 628. By tightening the thumb screws 628, an axial force is exerted against the base plate 622, which squeezes the gasket member 602, which forms a seal between and against the gasket 602 and the surface 607 of the member 606 of the holder 604. The surface 607 is explained above, can be considered the same as the tube sheet 628.

In the embodiment of the retainer 620 that is depicted, the base plate 622 includes tabs 654 projecting therefrom. The tabs 654 engage with the slots 649 in the flange 646 of the holder 604 to help hold the retainer 620 and the filter element 622 in operable orientation.

Figure 31:
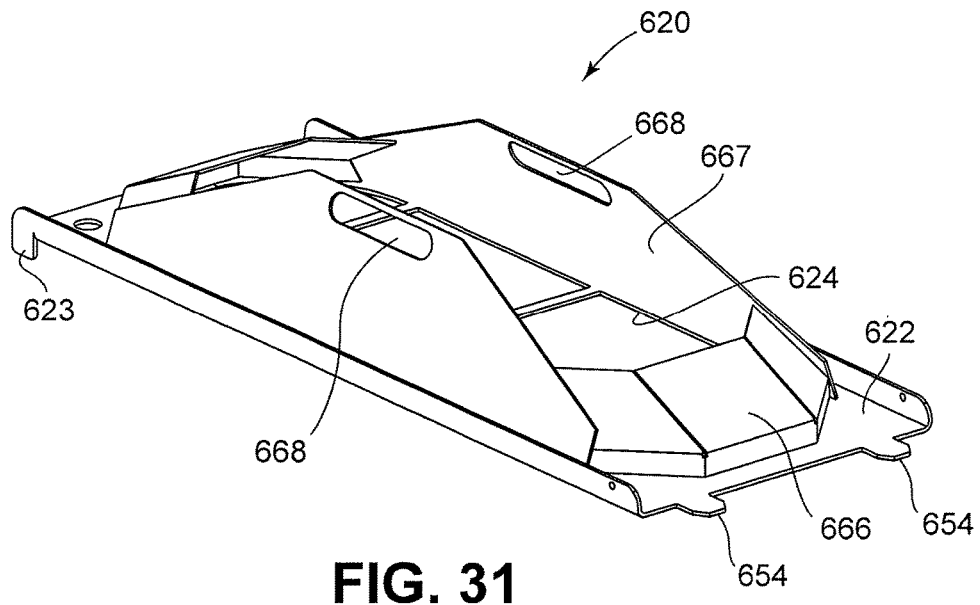
FIG. 31 is a perspective view of the retainer illustrated in FIGS. 29 and 30.
Figure 32:
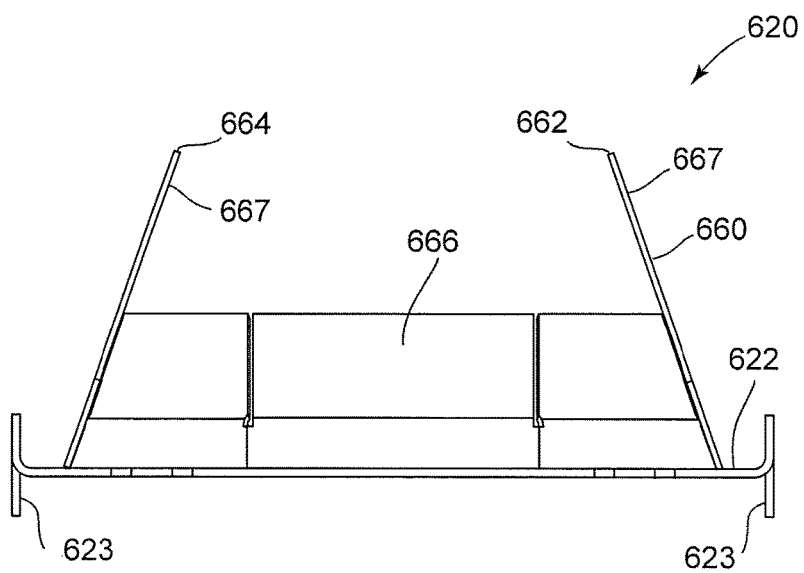
FIG. 32 is a front plan view of the retainer of FIG. 31.
Figure 33:
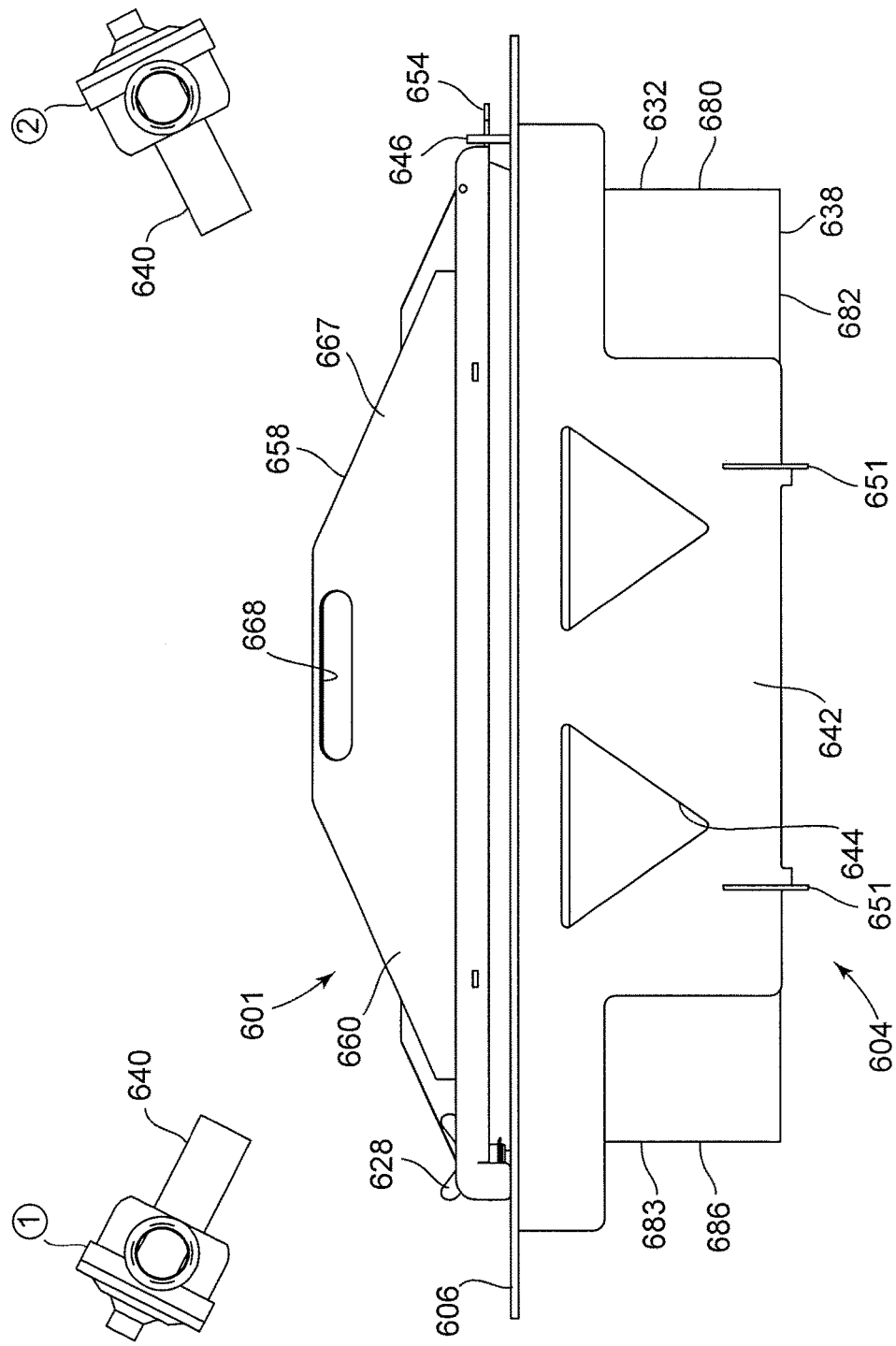
FIG. 33 is a side elevational view of the arrangement of FIG. 29.

In the filter retainer 620 illustrated in FIGS. 30 and 31, the retainer 620 includes a gasket compression stop 623. The stop 623 projects axially from the base plate 622 in a direction opposite of the direction that the hood 658 projects. The stop 623 will only allow the clamp arrangement 618 to be secured to a certain point, such that the gasket 602 is not overly squeezed or compressed. That is, the gasket 602 can only be compressed by the base plate 622 due the thumb screws 628 until the stops 623 axially abut the surface 607, of the member 606. At that point, interference between the stops 623 and the surface 607 will not permit the thumb screws 628 to be tightened any further.

In this embodiment of the retainer 620, there is an accumulator 656. The accumulator 656 is oriented to retain a pulse of gas over the downstream axial end 681 of the media pack 680. In the embodiment shown, the accumulator 656 includes a hood 658 secured to the base plate 622. It should be understood that by the term "secured to" it is meant that the base plate 622 and the hood 658 can be made from the same piece of material and be formed and bent into the appropriate desired structure. It can also be secured to with fastening mechanisms such as welding.

In the embodiment shown, the hood 658 includes a wall 660 extending around the opening 624 and also extending above the opening 624. The wall 660 has free end 662 defining an open mouth 664. The mouth 664 receives the jet of gas pulsed from the pulsing arrangement emitted through the blow pipes 640.

In the embodiment shown, the wall 660 has a pair of end panels 666 angled or slanted in a direction toward to opening 624 partially cover the opening 624. Also in this arrangement, the wall 660 includes a pair of side panels 667 slanted toward to partially cover the opening 624. The side panels 667 can be angled relative to the base plate 622 based upon the desired amount of accumulation. In the embodiment shown, the side panels 667 are angled relative to the base plate less than 90 degrees and greater than 30 degrees, for example, 45-80 degrees. The end panels 666, in the embodiment shown, are angled relative to the base plate 622 more sharply than the side panels 667. In this embodiment, the end panels 666 are angled greater than 0 degrees and less than 60 degrees, for example, 5-50 degrees.

In the embodiment shown, the side panels 667 also include handles 668. The handles 668 in this embodiment, are formed by openings in the side panels 667 that are sized to accommodate portions of a human hand. In this manner, the retainer 620 can be more easily grasped and manipulated by user when servicing the dust collector.

The hood 658 is formed and arranged relative to the blow pipes 640 to retain the pulse of gas coming from the blow pipes 640. In other embodiments, where the blow pipes 640 are arranged in different orientations, it would be helpful to have the hood 658 formed differently. Such an example is shown in the embodiment of FIGS. 35-40, described below.

Figure 34:
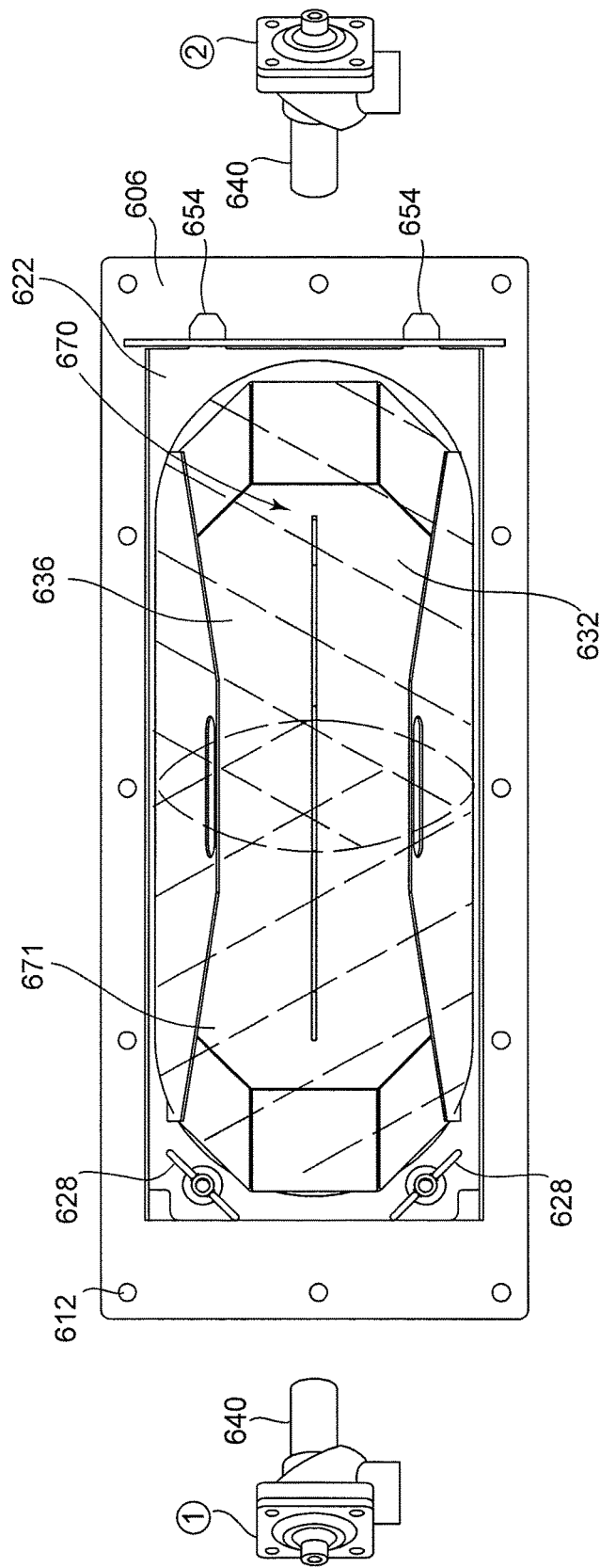
FIG. 34 is a top plan view of the arrangement of FIG. 29.
Figure 35:
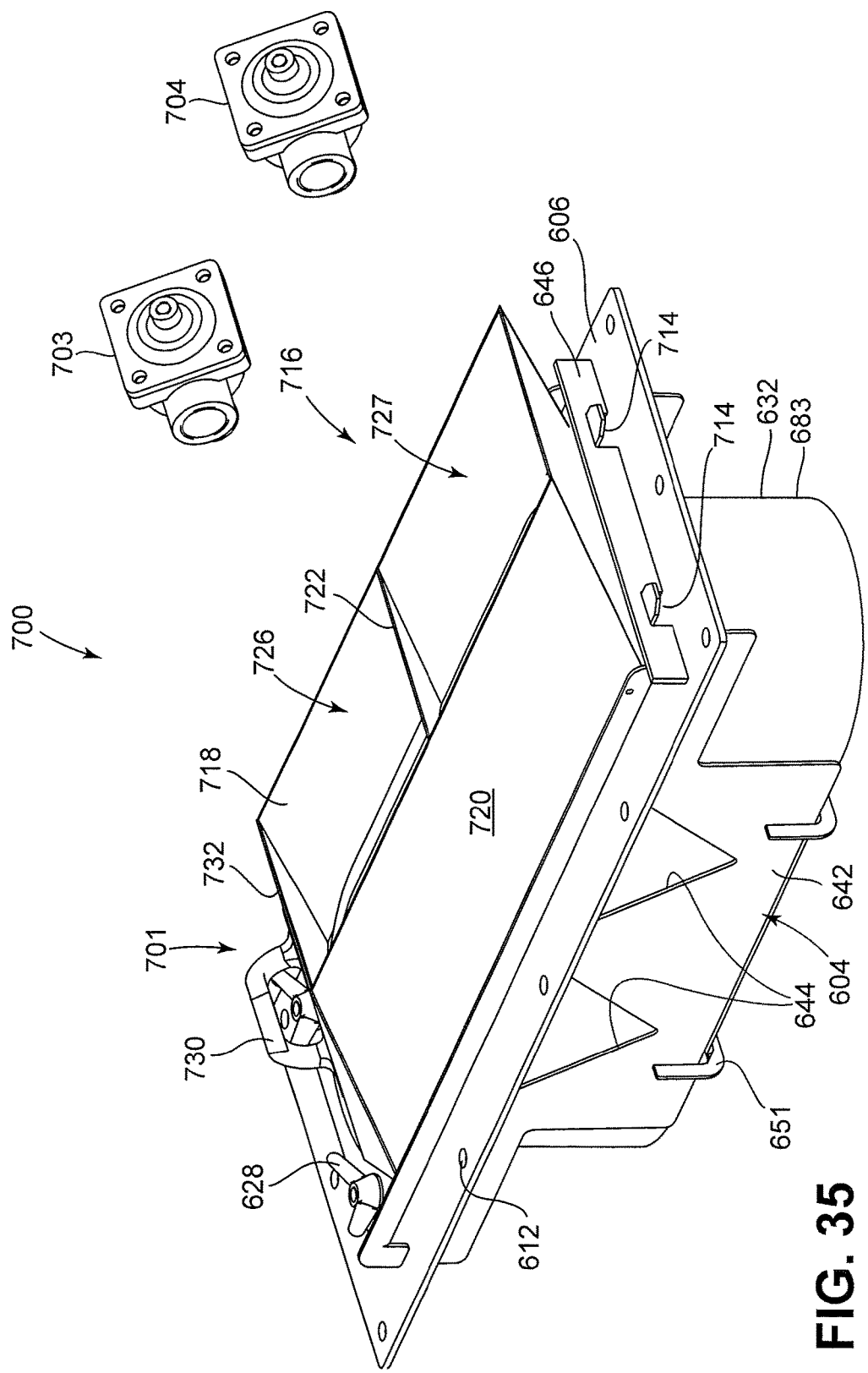
FIG. 35 is a schematic, perspective view of another embodiment of a filter element held by a retainer having an accumulator, constructed according to principles of this disclosure.
Figure 36:
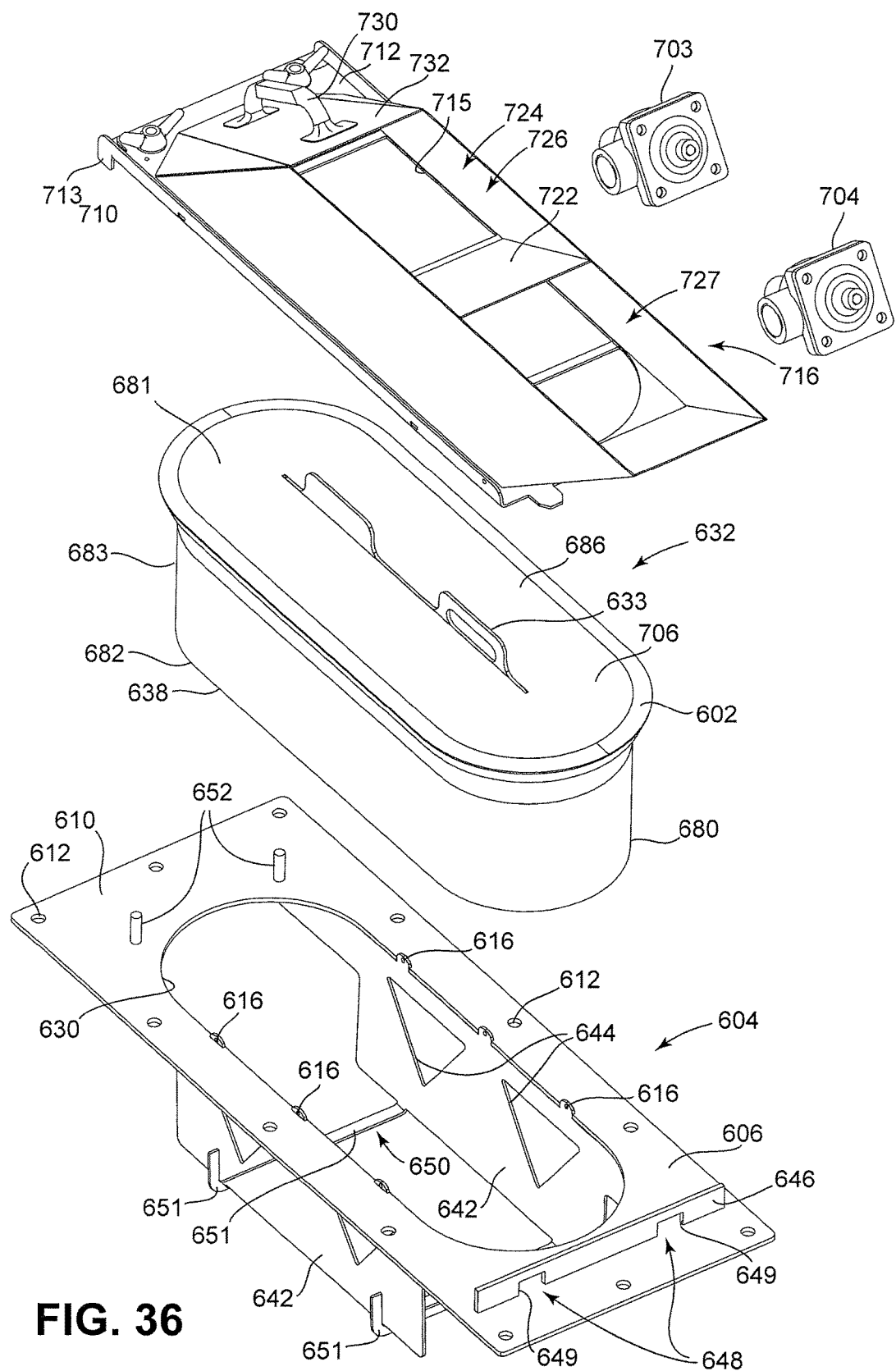
FIG. 36 is an exploded perspective view of the arrangement of FIG. 35.
Figure 37:
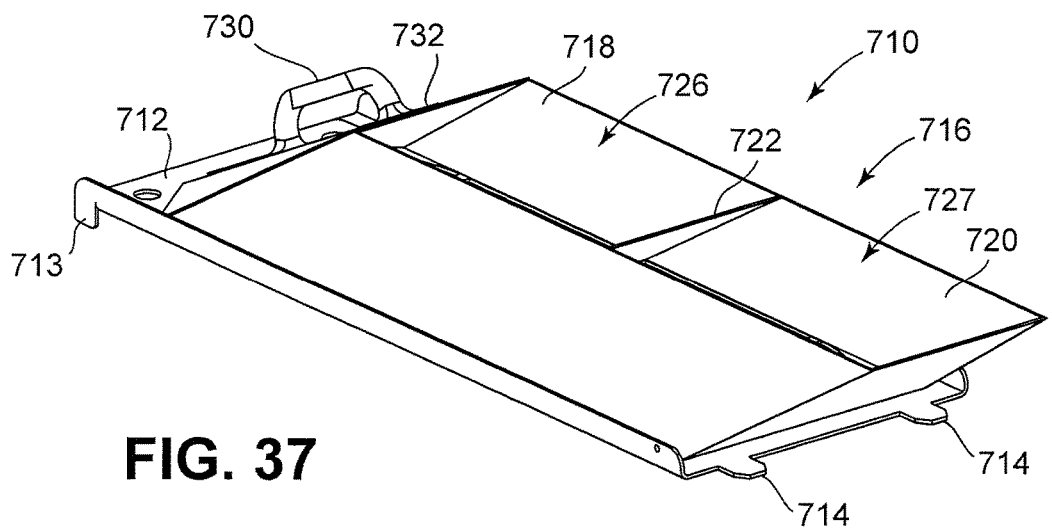
FIG. 37 is a perspective view of the filter retainer of FIGS. 35 and 36.
Figure 38:
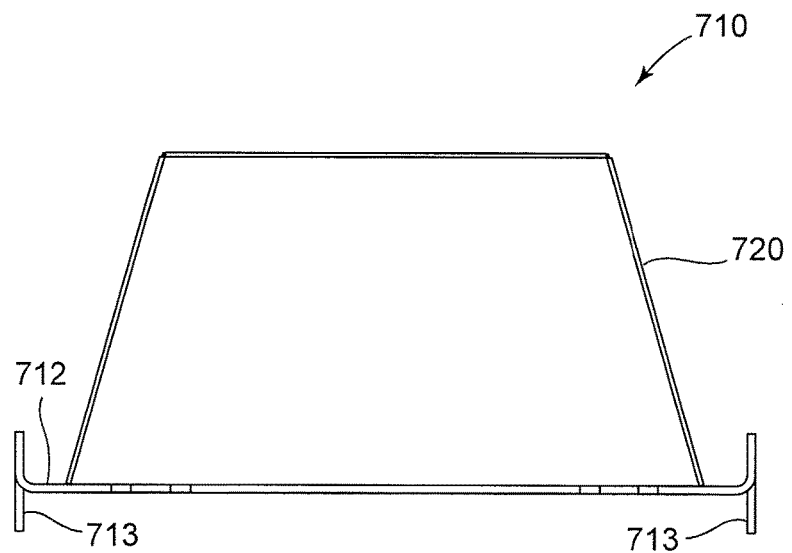
FIG. 38 is a front elevational view of the retainer of FIG. 37.
Figure 39:
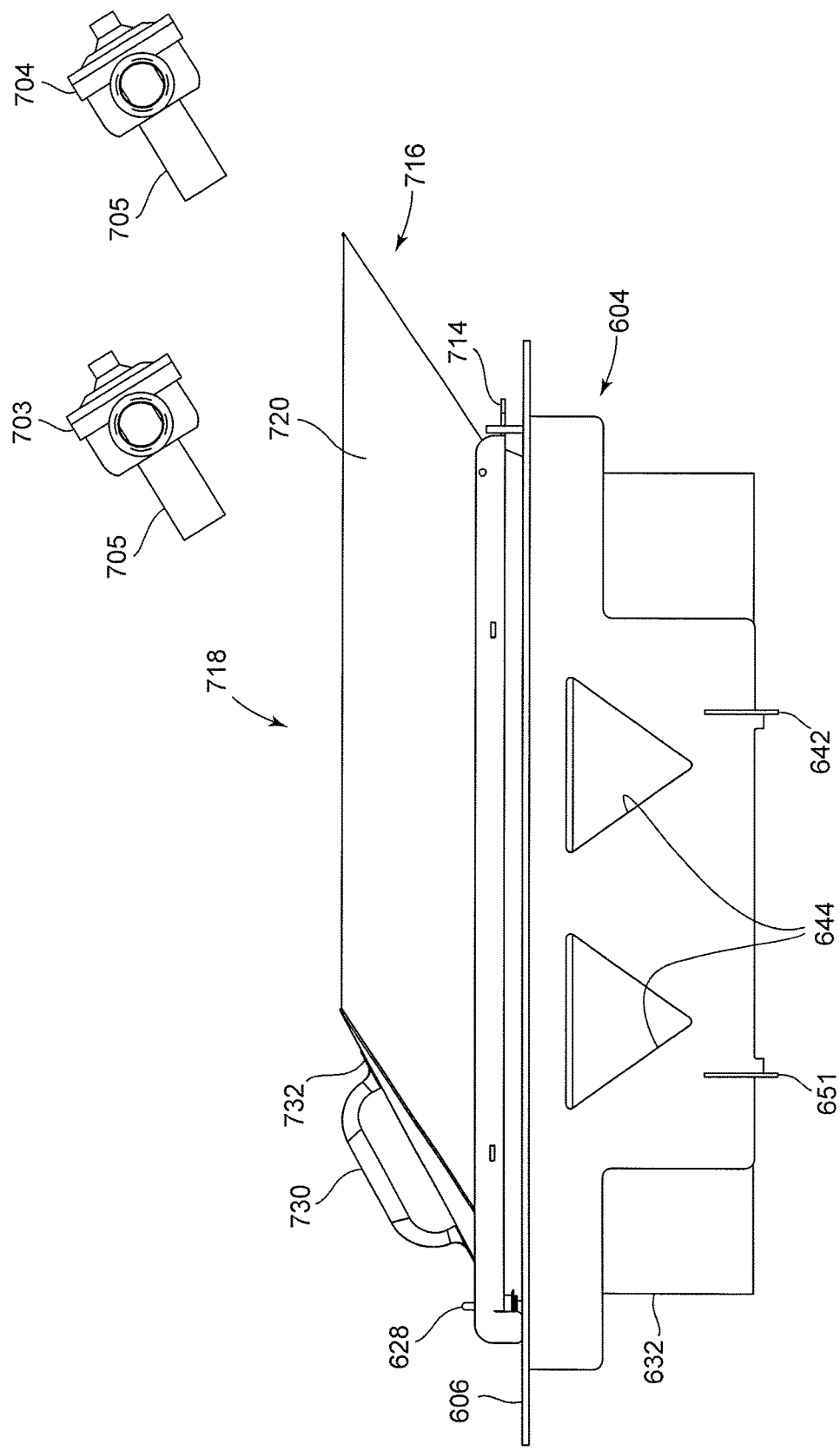
FIG. 39 is a side elevational view of the arrangement of FIG. 35.
Figure 40:
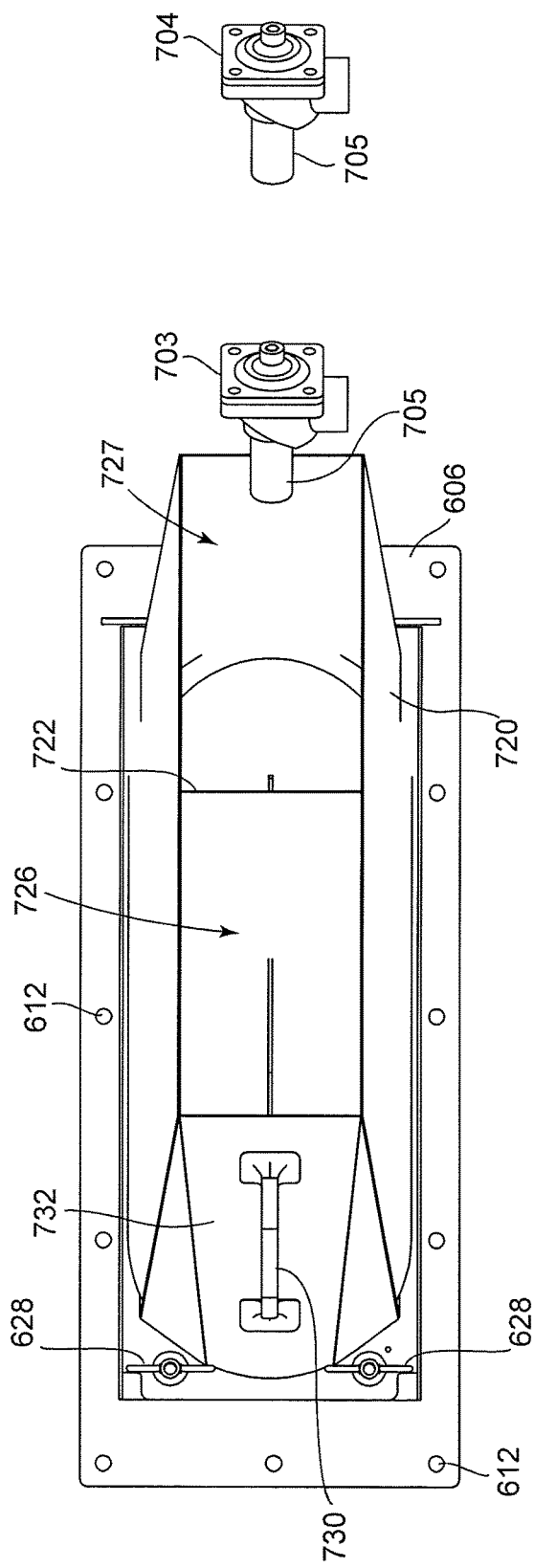
FIG. 40 is a top plan view of the arrangement of FIG. 35.

FIG. 34 illustrates schematically, the relative target pulse regions for the blow pipes 640. Valve 1 targets the end 670 of the filter element 632 that is opposite from the end which it is located. Valve 2 targets the end 671 which is at an end of filter element 632 opposite from where it is located. The two valves 1, 2 together cover the entire downstream flow face 636.

J. The Embodiment of FIGS. 35-40

Another embodiment of an arrangement is shown at 700 in FIGS. 35-40. The arrangement 700 includes a filter and retainer assembly 701 and a pair of valves 703, 704. The valves 703, 704 each have a blow pipe 705 (of FIG. 39). In this embodiment, the valves 703, 704 are arranged to be adjacent to the same end 706 of the filter element 632. The blow pipes 705 are angled relative to the downstream flow face 636, according to the description in connection with FIG. 2, above.

The assembly 701 includes the filter element 632 held by holder 604. The holder 604 is depicted as being the same structure as in the embodiment of FIGS. 29-34, and the description of the holder 604 is incorporated herein by reference. The filter element 632 is depicted as the same filter element 632 in FIGS. 29-34, and the description is incorporated herein by reference.

In the embodiment of FIGS. 35-40, analogous to the embodiment of FIGS. 29-34, there is a retainer 710. In this embodiment, the retainer 710 includes base plate 712, stop 713, tabs 714, opening 715, and an accumulator 716.

The accumulator includes a hood 718 that is used to retain the pulse from the valves 703, 704. The hood 718 is constructed from a wall 720 circumscribing the opening 715. In this embodiment, the wall 720 is slanted or angled in a direction generally aligned with the direction of the air pulse that emits from the valves 703, 704. In this embodiment, the wall 720 is angled relative to the base plate 712 between 10 and 80 degrees, for example, about 30-70 degrees. In this embodiment, the wall 720 further includes a splitter panel 722. The splitter panel 722 divides the open volume 724 defined by the wall 720 into a first volume 726 and a second volume 727. In general, the first valve 703 will pulse into the first volume 726, while the second valve 704 will pulse into the second volume 727. The valves 703, 704 may pulse simultaneously in this embodiment.

In the embodiment of FIGS. 35-40, the accumulator 716 further includes a handle 730. In the embodiment depicted, the handle 730 extends or projects from an end wall 732 of the wall 720 of the hood 718. The handle 730 is sized to receive at least portions of a human hand so that the accumulator 716 can be grasped and easily manipulated.

K. The Embodiment of FIGS. 41-44

Another embodiment of an accumulator 856 is shown in FIGS. 41-44, the accumulator 856 being an alternative embodiment to accumulator 656, shown in FIGS. 29-34 for use in arrangement 600. The description of all elements of arrangement 600 is incorporated herein by reference.

Accumulator 856 is oriented to retain a pulse of gas over the downstream axial end 681 of the media pack 680. In the embodiment shown, accumulator 856 includes a hood 858 that is secured to a base plate 822. It should be understood that by the term "secured to" it is meant that the base plate 822 and the hood 858 can be made from the same piece of material and be formed and bent into the appropriate desired structure. By "secured to" it is also meant that the base plate 822 and hood 858 can be fixed to each other with fastening mechanisms, such as welding. Additionally, base plate 822 is configured with thumb screws 828 that extend through the base plate 822 for connecting accumulator 856 to holder 604 and/or tube sheet 628.

In the embodiment shown, the base plate 822 has an opening 824, while the hood 858 includes a shroud section 860 that extends around and above the opening 824. The hood 858 also includes a throat section 862 and a scoop section 863 that define an open mouth 864. The open mouth 864 receives the jet of gas pulsed from the pulsing arrangement emitted through the blow pipes 640.

The throat section 862 has a diameter $D_1$ and a length $L_1$ wherein the throat section is spaced away from the base plate 822 by a distance, $L_2$. In this embodiment, there is advantage in an arrangement in which diameter $D_1$ ranges from about 0.5 to about 1.25 times the width of filter element 632, and is shown as being 0.9 times the width of filter element 632. Length $L_1$ can range from 0 to about 1 times the diameter $D_1$, and is shown as being about 0.08 times the width of filter element 632. Length $L_2$ can range from 0 to about 2.0 times the diameter $D_1$, and is shown as being about 0.2 times the diameter $D_1$.

The throat section 862 and the scoop section 863 are oriented such that their common central axis $X_1$ is at an angle $\alpha_1$ with respect to the general plane of base plate 822. Angle $\alpha_1$ can range from 0 degrees to about 85 degrees, and is shown as being about 37 degrees. Additionally, in particular embodiment illustrated, scoop section 863 has a frustoconical shape that expands in the direction extending away from base plate 822, at an angle $\alpha_2$ relative to central axis $X_1$. Angle $\alpha_2$ can range from 0 to about 15 degrees, and is shown as being about 5 degrees. The expanding shape of scoop section 863 allows for advantage, in that it allows for primary air flowing through the filter to undergo gradual expansion, thereby allowing for beneficial pressure regain. The scoop section 863 also acts as a convergence section for the pulse air flow. Although this expanding shape is beneficial, it is not required for the satisfactory operation of the accumulator 856. Further, as shown in FIGS. 43 and 44, the hood 858 of accumulator 856 may be configured without the scoop section 863.

L. The Embodiment of FIGS. 45-47g

Another embodiment of an accumulator 956 is shown in FIGS. 45-47g, the accumulator 956 being an alternative embodiment to accumulator 656, shown in FIGS. 29-34 for use in arrangement 600. The description of all elements of arrangement 600 is incorporated herein by reference.

Accumulator 956 is oriented to retain a pulse of gas over the downstream axial end 681 of the media pack 680. In the embodiment shown, accumulator 956 includes a hood 958 that is secured to a base plate 922. It should be understood that by the term "secured to" it is meant that base plate 922 and the hood 958 can be made from the same piece of material and be formed and bent into the appropriate desired structure. "Secured to" can also mean that base plate 922 and hood 958 are fixed to each other with fastening mechanisms, such as welding. Additionally, base plate 922 can be configured with thumb screws (not shown) that extend through the base plate 922 for connecting accumulator 956 to holder 604 and/or tube sheet 628.

In the embodiment shown, the base plate 922 has an opening 924 and the hood 958 includes a shroud section 960 that extends around and above the opening 924. The hood 958 also includes diverging section 962 and converging section 963 that together form a region of full flow for both the primary and pulse flows. Additionally, an open bell mouth 964 is connected to the converging section 963 on the end opposite the diverging section 962. The open bell mouth 964 receives the jet of gas pulsed from the pulsing arrangement emitted through the blow pipes 640 and also discharges the primary air flow from the filter. Although bell mouth 964 is not required, bell mouth 964 has a shape that forms a beneficial low entry pressure loss function for the pulse airflow.

In the embodiment shown, the diverging section 962 has a length $L_1$ and a central axis $X_1$. Length $L_1$ is determined by first cross-sectional area $A_1$, discussed later. As shown, length $L_1$ is 0.95 times $A_1$ and can range from about 0.25 to about 2.0 times $A_1$. Additionally, diverging section 962 is oriented such that its central axis $X_1$ is at an angle $\alpha_1$ with respect to the general plane of base plate 822. Angle $\alpha_1$ can range from 0 degrees to about 85 degrees, and is shown as being about 45 degrees.

In the embodiment shown, converging section 963 has a length $L_2$ and a central axis $X_2$. Length $L_2$ is determined by first cross-sectional area $A_1$, discussed later. As shown, length $L_2$ is 0.6 times $A_1$ and can range from about 0.25 to about 2.0 times $A_1$. Additionally, converging section 963 is oriented such that its central axis $X_2$ is at an angle $\alpha_2$ with respect to central axis $X_1$. Angle $\alpha_2$ can range from 0 degrees to about 85 degrees, and is shown as being about 13 degrees. In general the angles of the diverging and the converging sections, $\alpha_1$ and $\alpha_2$, are managed depending on the location of the pulse jet nozzle exhaust 640 and distance to the distance to the open mouth 964.

With reference to FIGS. 47a-47d, various cross-sections of hood 958 are shown, as referenced by the lettered cross-section identifiers on FIG. 47. By managing the cross-sectional areas as they progress through the hood 958 a converging-diverging enclosed volume region can be created which improves the pulse cleaning of the filter element 632 at lower pressures for the compressed air supply. This configuration allows the filter element 632 to operate for longer periods of time at lower operating pressures. This design can be fabricated, such as by stamping, from metals and from several processes utilizing plastics.

In the embodiment shown, converging section 963 has a first diameter $D_1$ and a corresponding first cross-sectional area $A_1$, shown at FIG. 47a, and corresponding to section V-V shown on FIG. 47. First cross-sectional area $A_1$ defines the maximum inlet/outlet diameter and is proportional to the width of the filter element 632. First diameter $D_1$ can range from about 0.25 to about 1.25 times the width of the filter element 632 and is shown at about 0.7 times the width of the filter element 632. Converging section 963 and diverging section 962 also share a second cross-sectional area $A_2$, shown at FIG. 47b, and corresponding to section W-W on FIG. 47. Second cross-sectional area $A_2$ is the smallest area cross-section that the full airflow of both the primary and pulse air flows will pass. Second cross-sectional area $A_2$ is determined according to first cross-sectional area $A_1$ and can range from about 0.25 to about 0.99 times $A_1$. As shown, $A_2$ is about 0.8 times $A_1$. Also, diverging section 962 and shroud section 960 share a third cross-sectional area $A_3$, shown at FIG. 47d, and corresponding to section Y-Y on FIG. 47. Area $A_3$, which is determined according to first cross-sectional area $A_1$, can range from about 1 to about 1.5 times $A_1$. As shown, $A_3$ is about 1.2 times $A_1$.

With reference to FIGS. 47e-47g, three additional cross-sectional views of shroud portion 960 are shown, as referenced by the lettered cross-section indications on FIG. 47.

FIGS. 47e, 47f and 47g show fourth, fifth and sixth cross-sectional areas $A_4$, $A_5$ and $A_6$, all of which are determined according to first cross-sectional area $A_1$. As shown, fourth cross-sectional area $A_4$ is about 1.2 times $A_1$ and can range from about 1 to about 1.5 times $A_1$. Fifth cross-sectional area $A_5$ is shown at about 0.8 times $A_1$ and can range from about 1 to about 0.5 times $A_1$. Finally, sixth cross-sectional area $A_6$ is shown at about 0.6 times $A_1$ and can range from about 1 to about 0.25 times $A_1$.

The above includes example principles. Many embodiments can be made based on these principles.

The invention claimed is:

1. A filter element retainer for a filter element having opposite, axial flow faces; the retainer comprising:
   (a) a base plate defining an opening sized to expose a flow face of the filter element;
   (b) a fastener arrangement configured to attach to a tube sheet; the fastener arrangement constructed and arranged to exert an axial force against the base plate and form a seal between the filter element and the tube sheet, when the filter element is operably positioned therein; and
   (c) an accumulator secured to the base plate and oriented to retain a pulse of gas over the flow face of the filter element, when the filter element is operably positioned therein; the accumulator including a hood secured to the base plate of the filter element retainer; the hood including a wall extending above the opening in the base plate; the wall having an end secured to the base plate and defining an open mouth.

2. The retainer of claim 1 wherein the fastener arrangement includes a pair of thumbscrews extending through the base plate.

3. The retainer of claim 1 wherein the base plate includes a pair of tabs projecting therefrom, the tabs being configured to engage slots in a tube sheet, when the retainer is attached to a tube sheet.

4. The retainer of claim 1 further including a bar extending across the opening and positioned to prevent the filter element from falling through the opening, when the filter element is operably positioned therein.

5. A dust collector comprising the retainer of claim 1, and further comprising:
   (a) a collector housing having a dirty air inlet, a clean air outlet, and a tube sheet dividing the housing between an unfiltered air volume and a clean air volume;
   (b) at least one filter element removably mounted and sealed within the tube sheet; the at least one filter element including:
      (i) a media pack having first and second opposite axial ends and a side extending between the first and second axial ends; and
      (ii) a gasket member adjacent to the side; the gasket member including first and second gasket regions separated by a channel;
         (A) the first gasket region being nearer the media pack than the second gasket region;
         (B) the channel being an open volume between the first and second gasket regions;
   (c) at least one projection angled relative to a plane of the tube sheet and extending into the channel of the gasket member;
   (d) an air direction arrangement constructed and arranged to draw air through the dirty air inlet, into the unfiltered air volume, through the at least one filter element, into the clean air volume, and then out through the clean air outlet; and wherein the fastener arrangement connects the retainer to the tube sheet and exerts an axial force against the base plate and the gasket member to form a seal between and against the gasket member and the tube sheet.

6. The dust collector of claim 5 further comprising:
   (a) a pulse arrangement constructed and arranged to direct a pulse of gas at a downstream axial end of the media pack.

7. A filter element retainer for a filter element having opposite, axial flow faces; the retainer comprising:
   (a) a base plate defining an opening sized to expose a flow face of the filter element;
   (b) a fastener arrangement configured to attach to a tube sheet; the fastener arrangement constructed and arranged to exert an axial force against the base plate and form a seal between the filter element and the tube sheet, when the filter element is operably positioned therein; and
   (c) an accumulator secured to the base plate and oriented to retain a pulse of gas over the flow face of the filter element, when the filter element is operably positioned therein; the accumulator including a hood secured to the base plate of the filter element retainer; the hood including a throat section and a shroud section extending above and around the opening in the base plate; the shroud having an end secured to the base plate.

8. The retainer of claim 7 wherein the fastener arrangement includes a pair of thumbscrews extending through the base plate.

9. The retainer of claim 7 wherein the base plate includes a pair of tabs projecting therefrom, the tabs being configured to engage slots in a tube sheet, when the retainer is attached to a tube sheet.

10. The retainer of claim 7 further including a bar extending across the opening and positioned to prevent the filter element from falling through the opening, when the filter element is operably positioned therein.

11. A filter element retainer for a filter element having opposite, axial flow faces; the retainer comprising:
   (a) a base plate defining an opening sized to expose a flow face of the filter element;
   (b) a fastener arrangement configured to attach to a tube sheet; the fastener arrangement constructed and arranged to exert an axial force against the base plate and form a seal between the filter element and the tube sheet, when the filter element is operably positioned therein; and
   (c) an accumulator secured to the base plate and oriented to retain a pulse of gas over the flow face of the filter element, when the filter element is operably positioned therein; the accumulator including a hood secured to the base plate of the filter element retainer; the hood including a shroud section that extends above and around the opening in the base plate; the shroud having an end secured to the base plate; the hood further including a diverging section that is connected to the shroud portion and a converging section that is connected to the diverging section; wherein the converging and diverging sections form a region of full flow for a primary filter air flow and a pulse air flow.

12. The retainer of claim 11 wherein the fastener arrangement includes a pair of thumbscrews extending through the base plate.

13. The retainer of claim 11 wherein the base plate includes a pair of tabs projecting therefrom, the tabs being configured to engage slots in a tube sheet, when the retainer is attached to a tube sheet.

14. The retainer of claim 11 further including a bar extending across the opening and positioned to prevent the filter element from falling through the opening, when the filter element is operably positioned therein.

15. A dust collector comprising:
(a) a filter element retainer for a filter element having opposite, axial flow faces; the retainer including,
  (i) a base plate defining an opening sized to expose a flow face of the filter element;
  (ii) a fastener arrangement configured to attach to a tube sheet; the fastener arrangement constructed and arranged to exert an axial force against the base plate and form a seal between the filter element and the tube sheet, when the filter element is operably positioned therein;
  (iii) an accumulator secured to the base plate and oriented to retain a pulse of gas over the flow face of the filter element, when the filter element is operably positioned therein;
(b) a collector housing having a dirty air inlet, a clean air outlet, and a tube sheet dividing the housing between an unfiltered air volume and a clean air volume;
(c) at least one filter element removably mounted and sealed within the tube sheet; the at least one filter element including:
  (i) a media pack having first and second opposite axial ends and a side extending between the first and second axial ends; and
  (ii) a gasket member adjacent to the side; the gasket member including first and second gasket regions separated by a channel;
    (A) the first gasket region being nearer the media pack than the second gasket region;
    (B) the channel being an open volume between the first and second gasket regions;
(d) at least one projection angled relative to a plane of the tube sheet and extending into the channel of the gasket member;
(e) an air direction arrangement constructed and arranged to draw air through the dirty air inlet, into the unfiltered air volume, through the at least one filter element, into the clean air volume, and then out through the clean air outlet; and
wherein the fastener arrangement connects the retainer to the tube sheet and exerts an axial force against the base plate and the gasket member to form a seal between and against the gasket member and the tube sheet.

16. The dust collector of claim 15 further comprising:
(a) a pulse arrangement constructed and arranged to direct a pulse of gas at a downstream axial end of the media pack.

17. The dust collector of claim 15 wherein the fastener arrangement includes a pair of thumbscrews extending through the base plate.

18. The dust collector of claim 15 wherein the base plate includes a pair of tabs projecting therefrom, the tabs being configured to engage slots in a tube sheet, when the retainer is attached to a tube sheet.

19. The dust collector of claim 15 further including a bar extending across the opening and positioned to prevent the filter element from falling through the opening, when the filter element is operably positioned therein.

20. The dust collector of claim 15 wherein the accumulator includes a hood secured to the base plate of the filter element retainer; the hood including a throat section and a shroud section extending above and around the opening in the base plate; the shroud having an end secured to the base plate.

21. The dust collector of claim 15 wherein the accumulator includes a hood secured to the base plate of the filter element retainer; the hood including a shroud section that extends above and around the opening in the base plate; the shroud having an end secured to the base plate; the hood further including a diverging section that is connected to the shroud portion and a converging section that is connected to the diverging section; wherein the converging and diverging sections form a region of full flow for a primary filter air flow and a pulse air flow.

* * * * *